(12) United States Patent  
Arakawa

(10) Patent No.: US 7,295,335 B2
(45) Date of Patent: Nov. 13, 2007

(54) SERVER APPARATUS, IMAGE PROCESSING APPARATUS, INFORMATION PROCESSING APPARATUS, CONTROL METHOD OF SERVER APPARATUS, CONTROL METHOD OF IMAGE PROCESSING APPARATUS, INFORMATION PROCESSING METHOD OF INFORMATION PROCESSING APPARATUS AND STORAGE MEDIUM THEREOF

(75) Inventor: Naoto Arakawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1059 days.

(21) Appl. No.: 09/892,450

(22) Filed: Jun. 28, 2001

(65) Prior Publication Data

US 2002/0051195 A1 May 2, 2002

(30) Foreign Application Priority Data

Jun. 30, 2000 (JP) ............................. 2000-198345
Jun. 13, 2001 (JP) ............................. 2001-178198

(51) Int. Cl.
*G06F 3/12* (2006.01)
*G06F 15/00* (2006.01)

(52) U.S. Cl. ..................................... 358/1.15; 358/1.13

(58) Field of Classification Search ................. 358/1.1, 358/1.15, 1.13, 1.18, 1.2, 1.6, 1.9, 1.11, 1.14, 358/1.16, 1.17, 530, 407, 474, 468; 715/500, 715/513; 347/2, 3, 5; 399/1, 8, 2
See application file for complete search history.

(56) References Cited

U.S. PATENT DOCUMENTS

| | | | | |
|---|---|---|---|---|
| 5,465,165 A | | 11/1995 | Tanio et al. ................. | 358/448 |
| 5,970,216 A | | 10/1999 | Tanio et al. ................. | 395/112 |
| 6,151,131 A | * | 11/2000 | Pepin et al. ............... | 358/1.13 |
| 6,567,180 B1 | * | 5/2003 | Kageyama et al. ........ | 358/1.15 |

* cited by examiner

*Primary Examiner*—Dov Popovici
(74) *Attorney, Agent, or Firm*—Fitzpatrick, Cella, Harper & Scinto

(57) ABSTRACT

Print image data which is image developed from page-description-language data of a document of which a specified page is previously marked by an insert mark set in a client computer is held in an image server so as to sequentially add optional scan insert originals to a designated page position of the document consisting of plural pages at arbitrary timing using a scanner function at an image server side also for originals of which data is not previously digitized without converting original data into raster image data at a client side. Data of insert originals is input in real time by a scanner in a digital color copying machine, and then the data is print output to a page designated by the marking when the print image data is print output from the digital color copying machine.

13 Claims, 20 Drawing Sheets

FIG. 12A

| JOB NO.: | DOCUMENT NAME: | THE NUMBER OF PAGES: | USER ID: | INSERT |
|---|---|---|---|---|
| 241 | TestDoc1003 | 10 | 002727 | — |
| 243 | YamakaDoc | 200 | 003622 | 60 |
| 244 | Doc-9896 | 100 | 000021 | 38 |
| 245 | DmyDoc001 | 18 | 000257 | — |
| 250 | DmyDoc002 | 15 | 000257 | — |
| 251 | DmyDoc003 | 12 | 000257 | — |
| 252 | Doc-3333 | 66 | 000525 | 38 |
| 253 | TestDoc1004 | 240 | 002727 | 89 |

SCAN INSERT PROC:  <JOB SELECTION>

CANCEL   OK

FIG. 12B

SCAN INSERT PROC:  <TYPE SETTING>

JOB NO.: 244
DOCUMENT NAME: Doc-9869
THE NUMBER OF PAGES: 100
USER ID: 000021

THE NUMBER OF TOTAL INSERT MARK PAGES: 38
INSERT MARK: @*MN#*

SELECT TYPE AT INSERT EXECUTION TIME:

(●) SCAN INSERT AT EACH PRINT
( ) INSERT AND STORE IN DESIGNATED JOB

DELETE JOB AFTER EXECUTION

CANCEL   OK

FIG. 18

STORAGE MEDIUM (FD, CD-ROM, ETC.)

| DIRECTORY INFORMATION |
|---|
| 1ST DATA PROC PROGRAM<br>PROGRAM CODE GROUP CORRESPONDING TO<br>STEPS OF FLOW CHARTS SHOWN IN FIGS. 13-15 |
| 2ND DATA PROC PROGRAM<br>PROGRAM CODE GROUP CORRESPONDING TO<br>STEPS OF FLOW CHARTS SHOWN IN FIG. 16 |
| 3RD DATA PROC PROGRAM<br>PROGRAM CODE GROUP CORRESPONDING TO<br>STEPS OF FLOW CHARTS SHOWN IN FIG. 17 |
| |

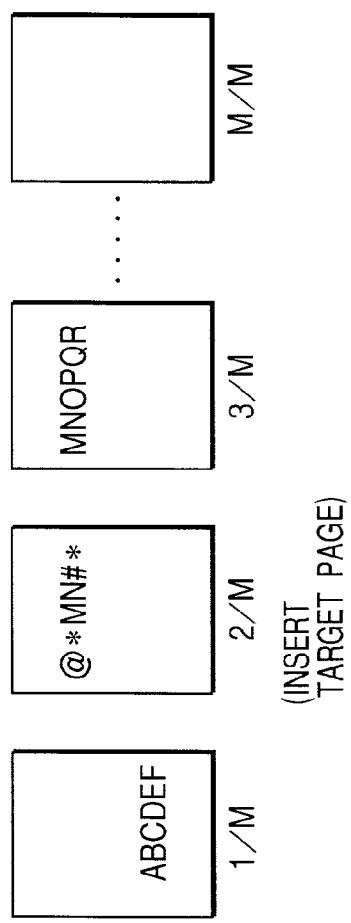
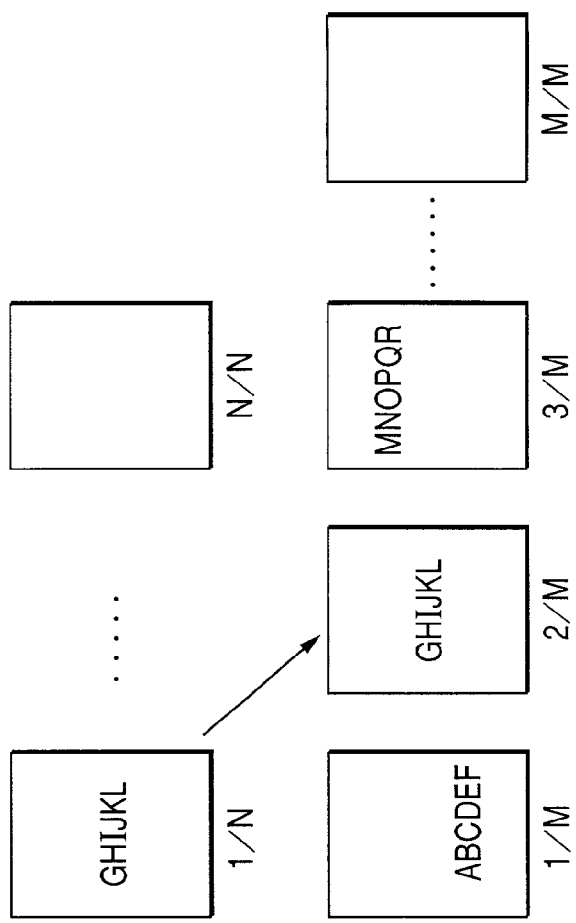

SERVER APPARATUS, IMAGE PROCESSING APPARATUS, INFORMATION PROCESSING APPARATUS, CONTROL METHOD OF SERVER APPARATUS, CONTROL METHOD OF IMAGE PROCESSING APPARATUS, INFORMATION PROCESSING METHOD OF INFORMATION PROCESSING APPARATUS AND STORAGE MEDIUM THEREOF

BACKGROUND OF THE INVENTION

1. Field of the Invention

The present invention relates to a server apparatus which manages print jobs, an image processing apparatus, an information processing apparatus, a control method of the server apparatus, a control method of the image processing apparatus, an information processing method of the information processing apparatus, and a storage medium thereof.

2. Related Background Art

In case of considering that data of an original not digitized on a computer is previously inserted in an arbitrary page of a series of documents, a method that the data of the original is once digitized by a scanner or the like on a client side, and that reading original is compiled as one page document by inserting it on the client side has been proposed.

However, in the above conventional method, a problem that it is very difficult to optionally exchange an original once inserted to documents of vast pages after the insertion has been considered. Therefore, it is desired to reduce a load of a user required in creating one document by using the plural apparatuses and improve operability.

SUMMARY OF THE INVENTION

An object of the present invention is to provide a server apparatus, an image processing apparatus and an information processing apparatus for solving the above problem, a control method of the server apparatus, a control method of the image processing apparatus, an information processing method of the information processing apparatus and a storage medium thereof.

Another object of the present invention is to provide a server apparatus, an image processing apparatus and an information processing apparatus for reducing a load of a user required in creating one document by using the plural apparatuses and improving operability, a control method of the server apparatus, a control method of the image processing apparatus, an information processing method of the information processing apparatus and a storage medium thereof.

Still another object of the present invention is to provide a server apparatus, an image processing apparatus, a control method of the server apparatus, a control method of the image processing apparatus and a storage medium thereof, wherein print image data which is image developed from PDL data of a document of which a specified page is previously marked by an insert mark set in the information processing apparatus is held, and data of insert originals is input in real time by a scanner in the image processing apparatus then the data is print output for a page designated by the marking when the print image data is print output from the image processing apparatus, thereby realizing to add an optional scan insert original to a designated page position of a document consisting of plural pages every time at arbitrary timing using a scanner function at the server apparatus side also for originals of which data is not previously digitized on the information processing apparatus without converting original data into raster image data at a client (information processing apparatus) side.

Still another object of the present invention is to provide a server apparatus, an image processing apparatus, a control method of the server apparatus, a control method of the image processing apparatus and a storage medium thereof, wherein the print image data which is image developed from the PDL data of the document of which the specified page is previously marked by the insert mark set in the information processing apparatus is held, and image data of insert originals input by the scanner in the image processing apparatus and transferred to the server apparatus is linked with a page designated by the marking of the print image data held in the server apparatus, thereby realizing to link a raster image of the insert original read by using the scanner function at the server apparatus side with a raster image corresponding to a page previously designated by the specified marking of the print image data on the server apparatus at arbitrary timing also for the originals of which data is not previously digitized on the information processing apparatus without converting the original data into the raster image data at the client (information processing apparatus) side, and a print job can be completed optionally adding the insert originals thereafter.

Other objects and features of the present invention will become apparent from the following description and the attached drawings.

BRIEF DESCRIPTION OF THE DRAWINGS

FIGS. 12A and 12B are schematic diagrams showing an example of a scan insert processing screen displayed on an operation panel by an operation panel controller in a scanner shown in FIG. 2;

FIG. 18 is a diagram for explaining a memory map of a storage medium for storing various data processing programs which can be read in the image server system to which the server apparatus and the image processing apparatus according to the present invention are applicable;

FIGS. 20A, 20B and 20C are diagrams for explaining insert processing executed in the embodiment.

DETAILED DESCRIPTION OF THE PREFERRED EMBODIMENT

Hereinafter, the preferred embodiment of the present invention will now be described in detail with reference to the accompanying drawings.

Figure 1:
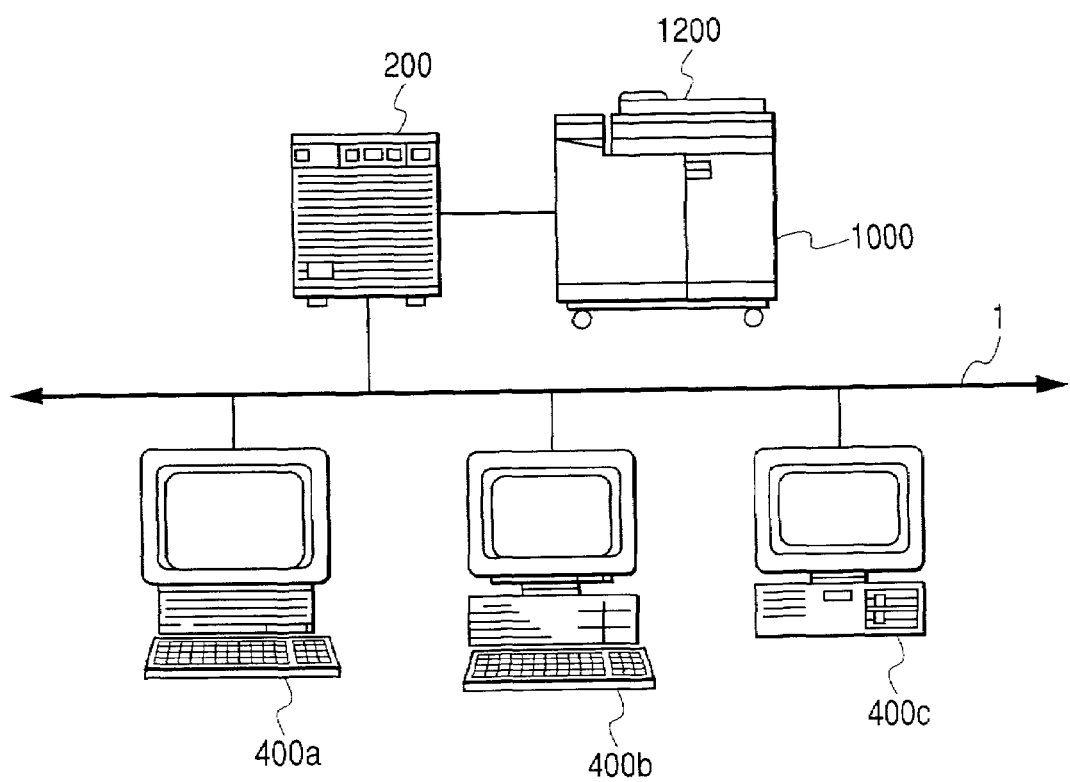
FIG. 1 is a diagram for explaining the structure of an image server system to which a server apparatus and an image processing apparatus according to the embodiment of the present invention are applicable.

FIG. 1 shows a structure of an image server system to which a server apparatus and an image processing apparatus according to the embodiment of the present invention are applicable.

As shown in FIG. 1, the image server system is composed of a digital color copying machine 1000, an image server 200 connected to a network 1 such as Ethernet or the like, other plural image servers (not shown) each having the same structure as that of the image server 200, and plural client user's computers 400a, 400b and 400c (hereinafter simply called a computer 400). Here, the digital color copying machine 1000 has a digital color image reading unit (hereinafter called a color scanner or a scanner) at its upper part, a circulation-type reflection original feed device (hereinafter called a feeder or an ADF (automatic document feeder)) 1200 for setting an original to the color scanner, and a digital color image printer (hereinafter called a color printer or a printer) for printing and outputting a digital color image. The color scanner and the color printer respectively correspond to a scanner 100 and a printer 300 both shown in FIG. 2. In the digital color copying machine 1000, the scanner 100, the feeder 1200 and the printer 300 perform communication to perform a predetermined image process.

Figure 2:
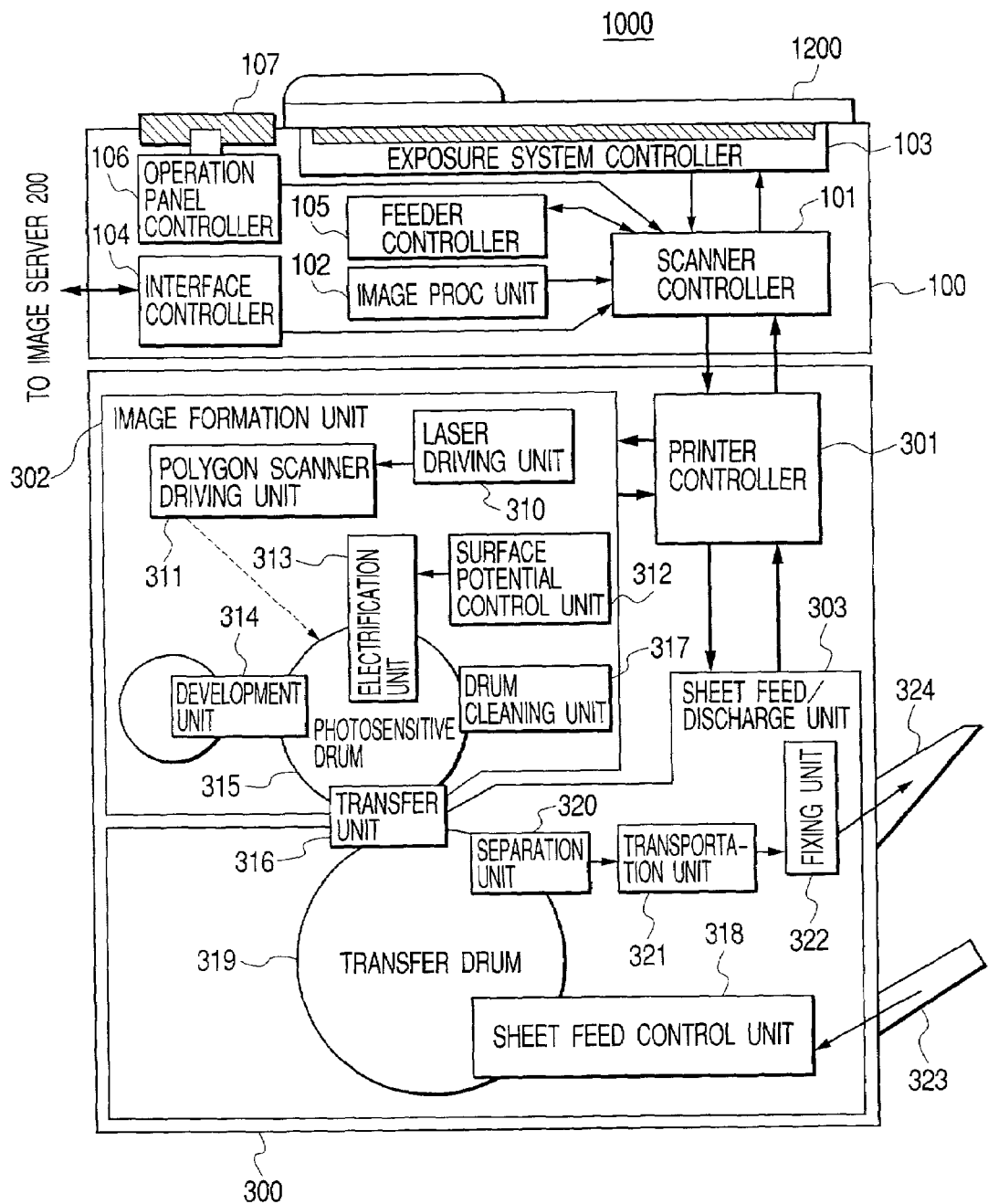
FIG. 2 is a diagram showing the structure of a color digital copying machine and a feeder shown in FIG. 1.

FIG. 2 shows a structure of the color digital copying machine 1000 and a structure of the feeder shown in FIG. 1. In FIG. 2, the same parts as those in FIG. 1 are added with the same numerals.

Figure 3:
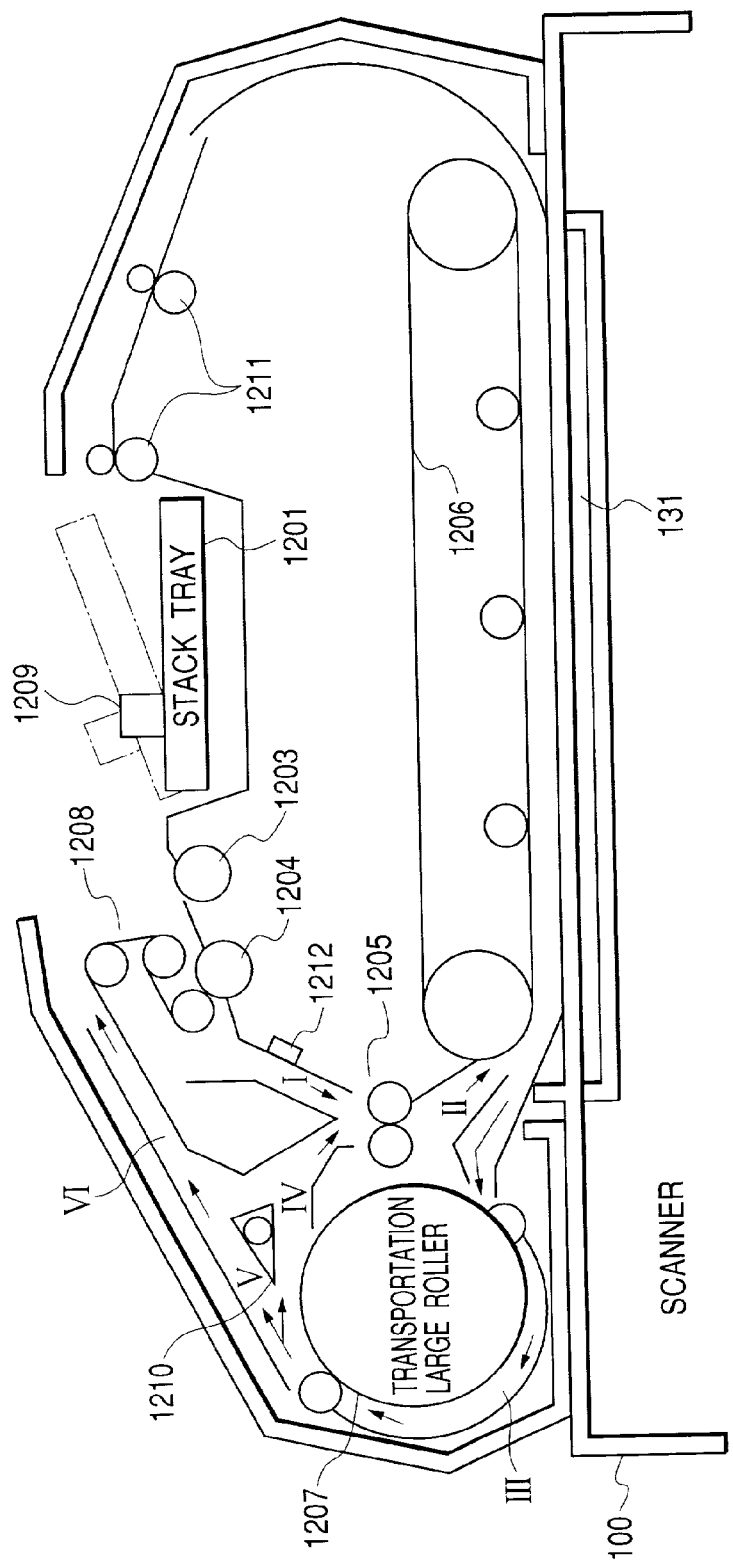
FIG. 3 is a cross-sectional diagram showing the structure of the feeder shown in FIG. 1.

FIG. 3 shows a structure of the feeder 1200 shown in FIG. 1. In FIG. 3, the same parts as those in FIG. 1 are added with the same numerals.

First, as shown in FIG. 2, in the scanner 100, mainly a scanner controller 101 performs following control.

Each of R (red), G (green) and B (blue) color components obtained from an original put on an original mounting board is subjected to color separation by a contact-type CCD (charge-coupled device) line sensor (not shown) of an exposure system controller 103, whereby a dot-sequential analog image signal is obtained. Then, the dot-sequential analog image signal is converted into an eight-bit digital image signal for each color by an A/D (analog-to-digital) converter (not shown), whereby the R, G and B colors being brightness are output as line-sequential signals respectively. Incidentally, the scanner controller 101 is connected to the image server 200 through an interface controller 104.

In the output digital image signals, R, G and B brightness levels are respectively converted into levels corresponding to toner quantities of C (cyan), M (magenta), Y (yellow) and Bk (black) colors being densities by an image processing unit 102. At this time, a color correction operation is performed by the image processing unit 102, and various image processes such as image composite, magnification change, image shift and the like are performed also by the image processing unit 102.

Further, in the image processing unit 102, an operation process of data from a reflection original and print data synchronous with this data and sent from the image server 200 can be performed. Thus, the image processing unit 102 composites the reflection original data and the print data in the R, G and B brightness levels.

Further, there are provided an operation panel/touch sensor 107 which has both a function as an operation panel to display messages to a user and a function as a touch sensor to indicate operations, and an operation panel controller 106 which controls the operation panel/touch sensor 107.

The feeder 1200 is disposed and set above the original mounting board of the color scanner 100, and controlled by a feeder controller 105 in the color scanner 100.

Further, as shown in FIG. 3, a stack tray 1201 on which a sheaf of originals is set has guides (not shown). These guides slide along the direction perpendicular to the original feed direction to regulate the width direction of the original such that the original does not oblique during feeding. At this time, also a slide volume operates to be able to detect the size of the original in the width direction.

In case of one-faced originals, the original is separated one by one from the lowermost part of the sheaf on the stack tray 1201 by a semilunar roller 1203 and a separation roller 1204, and the width of the separated original in the feed direction is detected by a contact-type width sensor 1212 in a path I while the separated original is being transported in the path I. Then, after passing the path I, the original is transported and stopped at the exposure position on a platen glass 131 by transportation rollers 1205 and a full-surface belt 1206.

After the original was scanned, the original on the platen glass 131 is again returned to the uppermost part of the sheaf by a transportation large roller 1207 and discharge rollers 1208 (in case of small size, by the full-surface belt 1206 and discharge rollers 1211).

When the original feed starts, a recycle lever 1209 is put on the sheaf of the originals. Then, the originals are sequentially fed and the trailing edge of the last original of this sheaf passes the recycle lever 1209, this lever 1209 falls on the stack tray 1201 by its own weight, whereby one cycle of the originals constituting the sheaf is detected.

On the other hand, in case of two-faced originals, after the original was scanned in the above manner, such the original is once guided to a path III, and a rotatable change flapper 1210 is rotatively shifted to guide the leading edge of the original to a path IV. Thus, the original is again set onto the platen glass 131 through a path II by the transportation rollers 1205 and the full-surface belt 1206. Namely, the original is reversed through the paths III, IV and II by rotation of the transportation large roller 1207.

Further, when the originals of the sheaf are transported one by one through the paths I, II, III, V and VI until the one cycle of the originals is detected, the number of originals can be counted by the width sensor 1212.

Further, as shown in FIG. 2, in the printer 300, mainly a printer controller 301 performs control. In an image formation unit 302, the C, M, Y and Bk digital image signals transferred from the scanner 100 are converted into lighting signals of a semiconductor laser unit (not shown), the laser unit is controlled by a laser driving unit 310, and the lighting signals are output from the laser driving unit 310 through a polygon scanner driving unit 311 as pulse widths corresponding to the levels of the digital image signals. The laser lighting levels are 256 levels (corresponding to eight bits). According to the digital image signals to be output, the color image is restricted for each of C, M, Y and Bk colors. Then, the respective colors are sequentially exposed on a photosensitive drum 315 in digital dot format, the exposed colors are developed by a development unit 314, the developed colors are transferred to a sheet on a transfer drum 319 by a transfer unit 316. The sheet on which the colors have been transferred is transported to a fixing unit 322 through a separation unit 320 and a transportation unit 321, and toners of these colors transferred on the sheet are fixed by the fixing unit 322, whereby the color image is reproduced. Namely, in the embodiment, the printer 300 is assumed to be an electrophotographic laser beam printer. Besides, numeral 312 denotes a surface potential control unit, numeral 313 denotes an electrification unit, numeral 317 denotes a drum cleaning unit, numeral 303 denotes a sheet feed/discharge unit, numeral 323 denotes a sheet cassette, numeral 318 denotes a sheet feed control unit, and numeral 324 denotes a tray.

When the feeder 1200 and the color printer 300 are controlled by the color scanner 100, the composition of the color scanner 100, the feeder 1200 and the color printer 300 can function as the digital color copying machine 1000.

When such the composition functions as the digital color copying machine 1000, the original (image) is set on the original mounting board of the color scanner 100, and a copy start key displayed on the operation panel is depressed. Thus, the image read from the color scanner 100, the image process, and the exposure, development, transfer and fixing in the color printer 300 are performed according to the above procedures, whereby the image is formed and output as a color copy.

In FIG. 2, the printer 300 is explained as the laser beam printer. However, the printer 300 may be a printer of another electrophotographic system (e.g., an LED (light emitting diode) printer), inkjet system, thermal transfer system, sublimate system, or other system.

Figure 4:
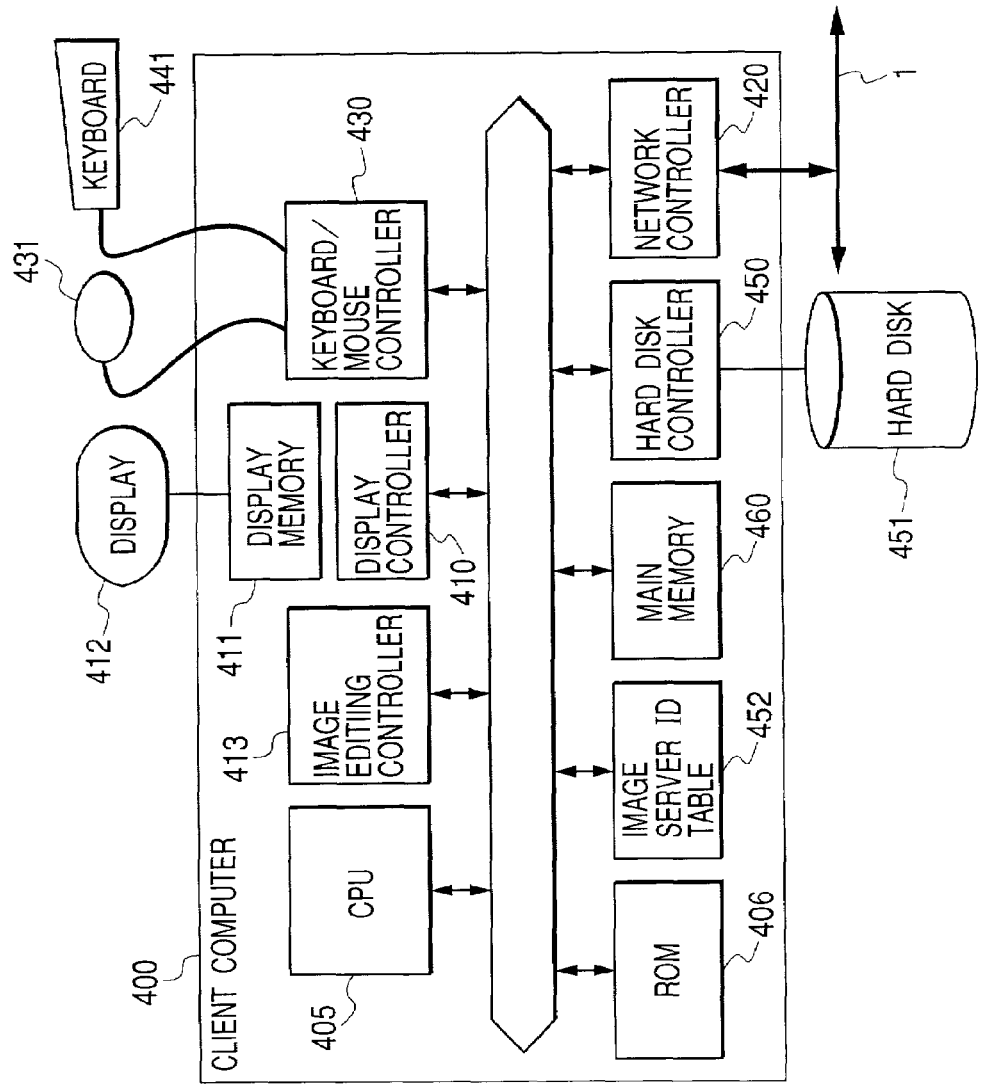
FIG. 4 is a block diagram showing the structure of client computers shown in FIG. 1.

FIG. 4 is a block diagram showing the structure of the client computer 400 shown in FIG. 1. In FIG. 4, the same parts as those in FIG. 1 are added with the same numerals.

In FIG. 4, the client computer 400 is composed of a network controller 420 which controls protocols on a network 1 connected to the image server 200, a CPU (central processing unit) 405 which mainly controls the client computer 400 itself, a hard disk 451 which temporarily registers image data and stores various data, a hard disk controller 450 which controls the hard disk 451, a main memory 460, a mouse 431 and a keyboard 441 which act as instruction input means from an operator, a keyboard/mouse controller 430 which controls the keyboard 441 and the mouse 431, a color display 412 which displays layouts, editing and menus, a display memory 411, a display controller 410, an image editing controller 413 which performs image layout and editing on the display memory 411, a ROM (read-only memory) 406, and an image server ID (identification) table 452.

Figure 5:
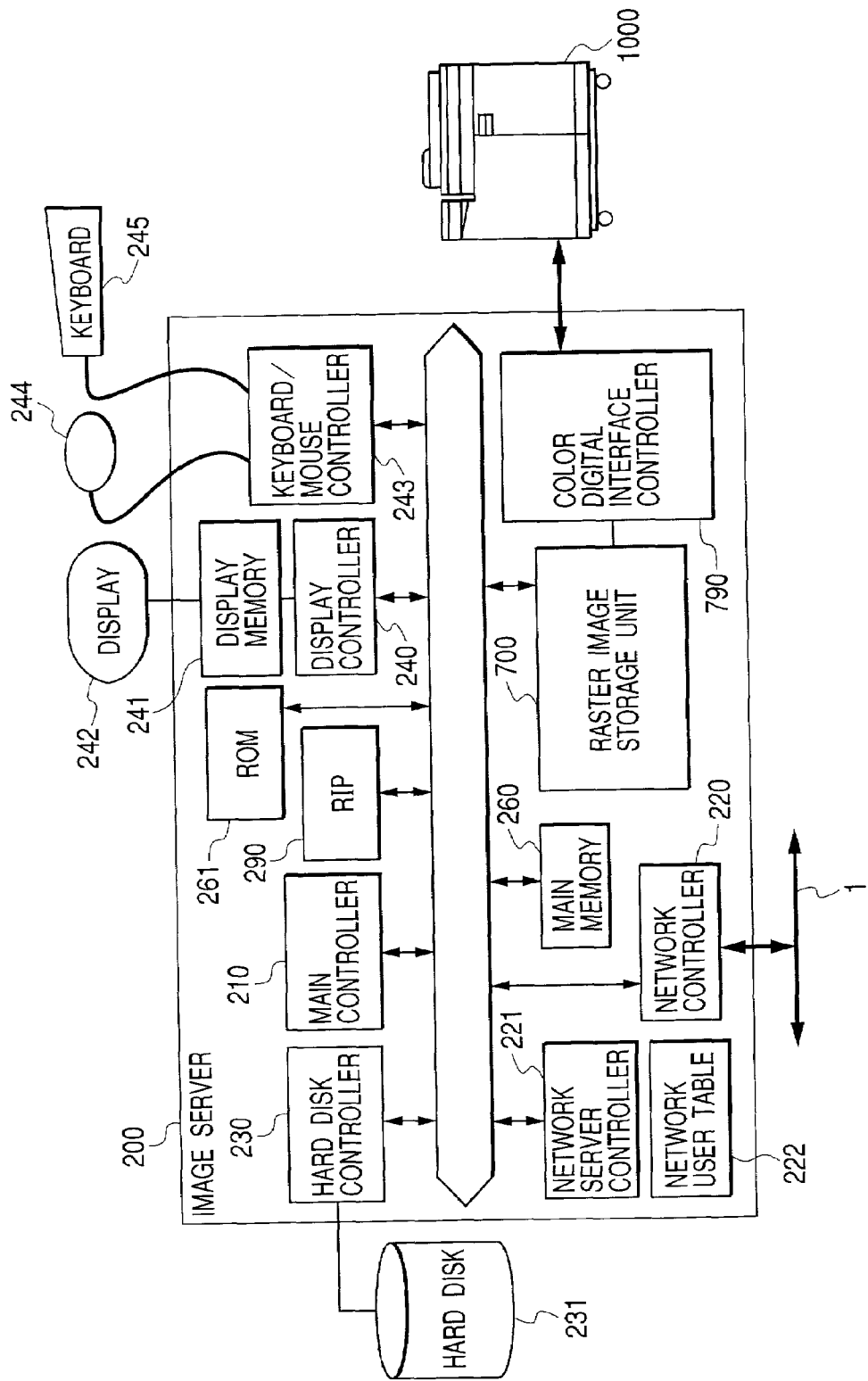
FIG. 5 is a block diagram for explaining the structure of an image server shown in FIG. 1.

FIG. 5 is a block diagram showing the structure of the image server 200 shown in FIG. 1. In FIG. 5, the same parts as those in FIG. 1 are added with the same numerals. It should be noted that the embodiment is applicable even if the image server 200 is built in the copying machine 1000.

The image server 200 is mainly composed of a main controller 210 which entirely controls the image server 200, a ROM 261, a hard disk controller 230 which controls a hard disk 231, a network controller 220 which controls protocols on the network 1, a network server controller 221 which performs control as a server (e.g., analyzing contents of packets extracted according to the protocols, separating image data from the packets, and the like), a network user table 222 on which client computer names, their network addresses and registered user ID's in the respective client computers are correlatively arranged, an RIP (raster image processor) 290 which creates color multivalue raster image data according to PDL (page description language) data extracted based on the separated image and command data, and a raster image storage unit 700 which stores and manages the created color multivalue raster image data, its position and its attribute information.

The interface of the image server 200 is composed of a color digital interface controller 790 which exchanges image data and instructions with the digital color copying machine 1000, a mouse 244 and a keyboard 245 which act as instruction input means from a server manager, a keyboard/mouse controller 243 which controls the keyboard 245 and the mouse 244, a color display 242 which displays layouts, editing and menus, a display memory 241, a display controller 240, and the like.

Figure 6:
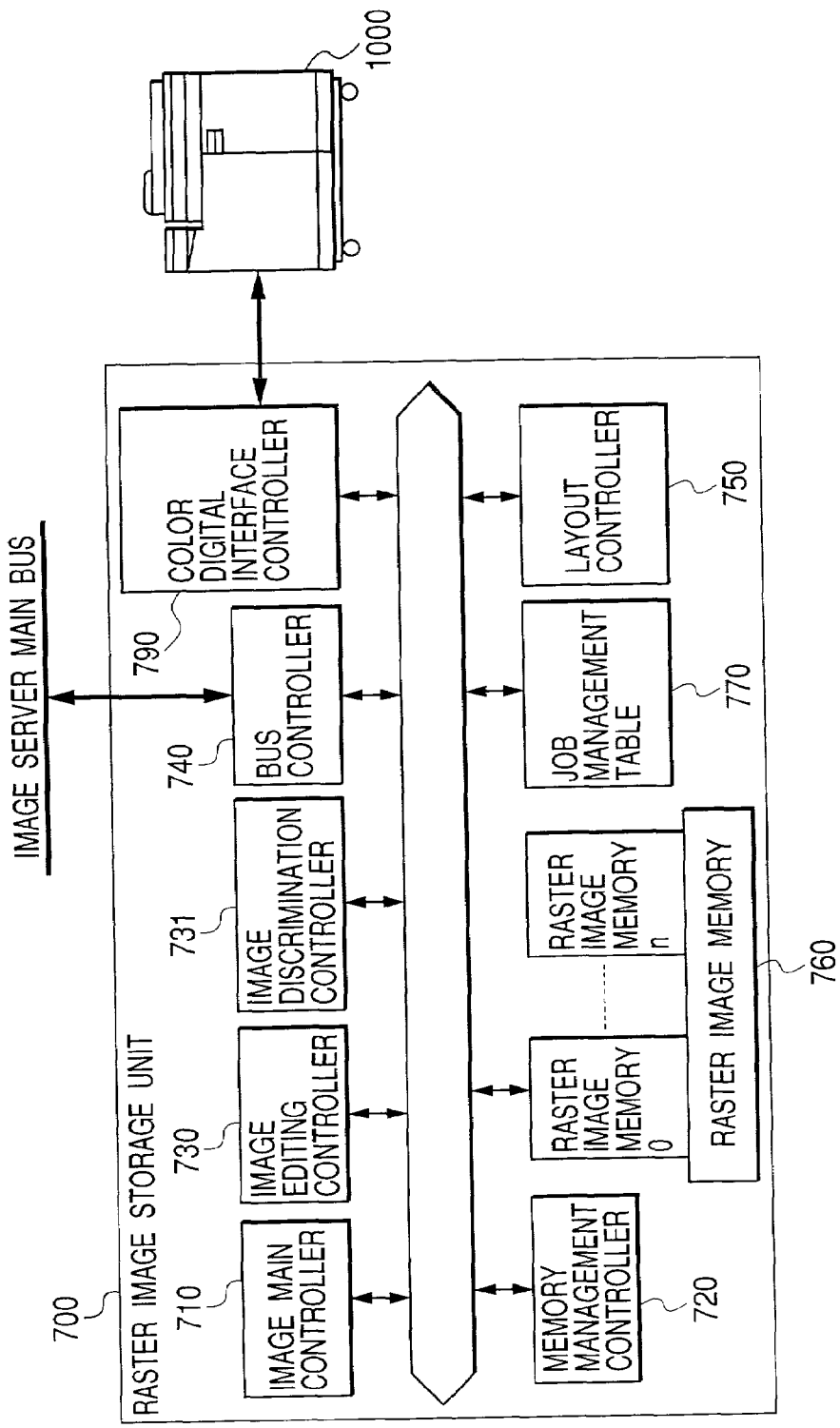
FIG. 6 is a block diagram showing the structure of a raster image storage unit in the image server shown in FIG. 5.

FIG. 6 is a block diagram showing the structure of the raster image storage unit 700 of the image server 200 shown in FIG. 5. In FIG. 6, the same parts as those in FIG. 5 are added with the same numerals.

In FIG. 6, the raster image storage unit 700 is mainly composed of an image main controller 710 which entirely controls the raster image data, a memory management controller 720 which efficiently arranges the color raster image data on a raster image memory 760 and manages the arranged data, a job management table 770 on which jobs of the memory management controller 720 are arranged, an image editing controller 730 which performs conversion, enlargement, reduction and modification of colors when the image data already registered or read from the scanner is registered as an image on a memory, an image discrimination controller 731, a layout controller 750 which performs real-time layout editing when the image data is output to the printer unit.

When the image data on the memory is output, such the image data is transferred to the color printer 300 through a color digital interface controller 790, whereby a color print image can be obtained.

Further, the image data input from the color scanner 100 can be registered on the memory through the color digital interface controller 790.

The image data and the instruction are exchanged between the raster image storage unit 700 and a main bus of the image server 200 on the basis of specific format. Namely, the image data and the instruction are exchanged between image main controller 710 and the main controller of the image server 200 through a bus controller 740.

Further, the raster image storage unit 700 can manage the image data in a file management mode.

The file management mode in the printer output is the mode to store and manage plural image data. The plural registered image data are laid out based on the instruction from the main controller 210 of the image server 200, and the laid-out image data are output to the color printer 300 through the color digital interface controller 790, whereby the color print image can be obtained.

At this time, a group of the image data of one job constituted by plural pages is managed as image files in plural memory areas (raster image memories 0, . . . , n shown in FIG. 6) obtained by dividing the raster image memory 760. Namely, information including an image file ID, an image data size, the number of total pages of the image data and the like is registered in the job management table 770, and the registered information is managed by the memory management controller 720.

In case of actually outputting the image data, the image data is output to the color printer 300 through the image editing controller 730 performing the color conversion of the registered image data, the layout controller 750 performing the enlargement, reduction and modification editing in the layout output, and the color digital interface controller 790.

Further, in the scanner input, as well as the printer output, the plural scanner input image data can be stored and managed in the file management mode. At this time, the image data for the printer output and the image data of the scanner input can be mixed with each other.

The image input from the scanner is managed as image files in the plural memory areas obtained by dividing the raster image memory 760, as well as the case of the printer output. Namely, information including an image file ID, an image data size and the like is registered in the job management table 770, and the registered information is managed by the memory management controller 720.

In case of actually inputting the image data, the scanner input image data from the color scanner 100 is transferred through the image editing controller 730 performing the color conversion of the input image data and the layout controller 750 performing the enlargement, reduction and modification editing for the input data. Thus, the image data is processed to have the size designated by the layout controller 750, and then registered on the raster image memory 760.

It should be noted that the structure of each of plural other image servers (not shown) is the same as that of the image server 200, and there is no problem even if the structures of plural digital color copying machines are the same or functionally different.

Figure 7:
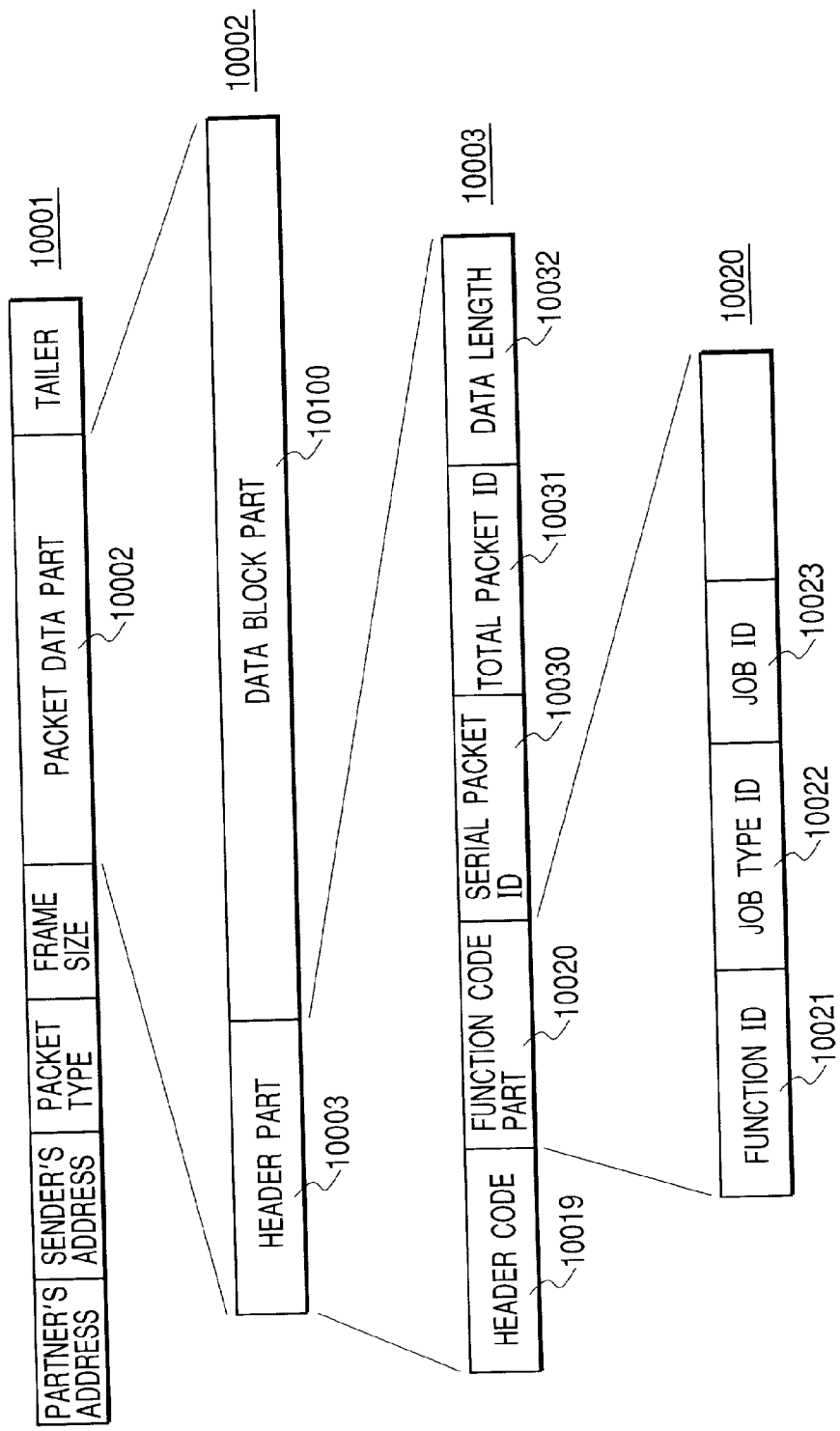
FIG. 7 is a diagram for explaining the structure of a network packet used for performing a communication on a network on which the client computers and the image server shown in FIG. 1 are connected each other.
Figure 8:
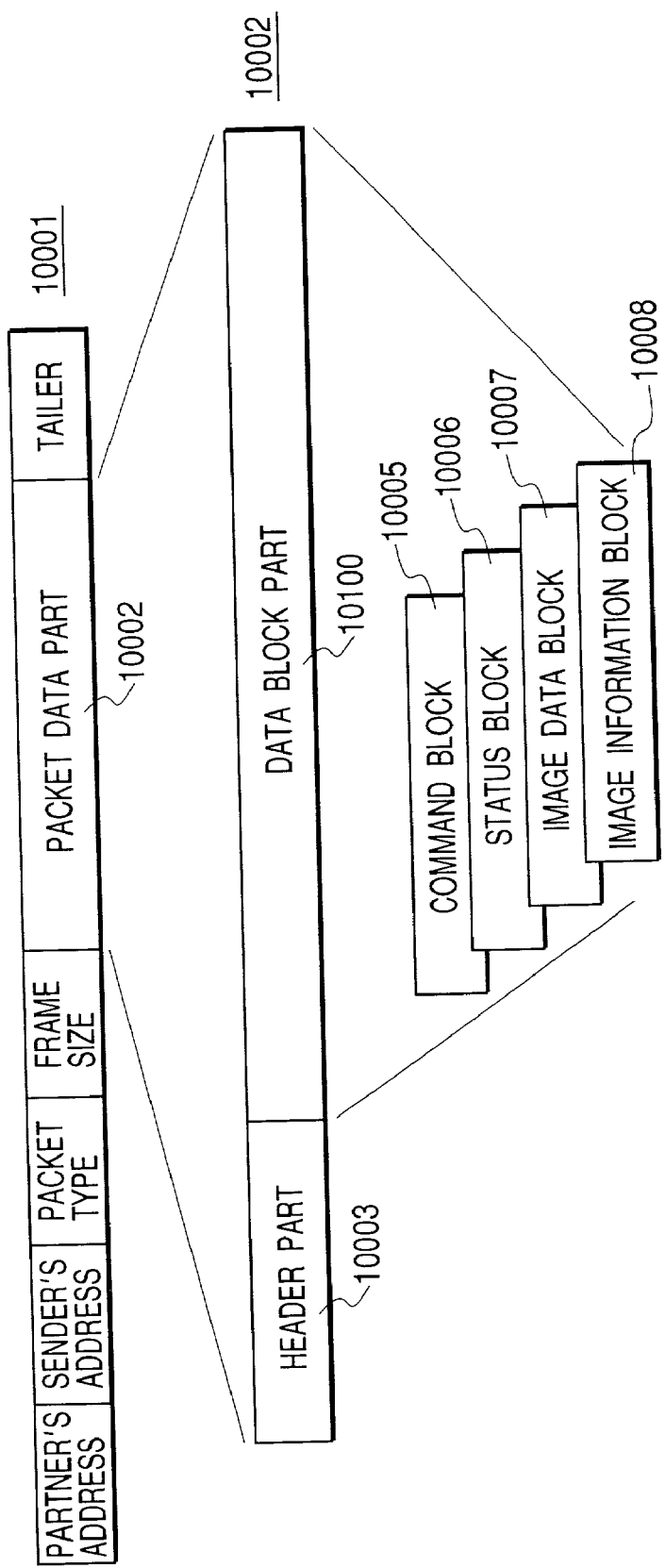
FIG. 8 is a diagram for explaining the structure of the network packet used for performing the communication on the network on which the client computers and the image server shown in FIG. 1 are connected each other.
Figure 9:
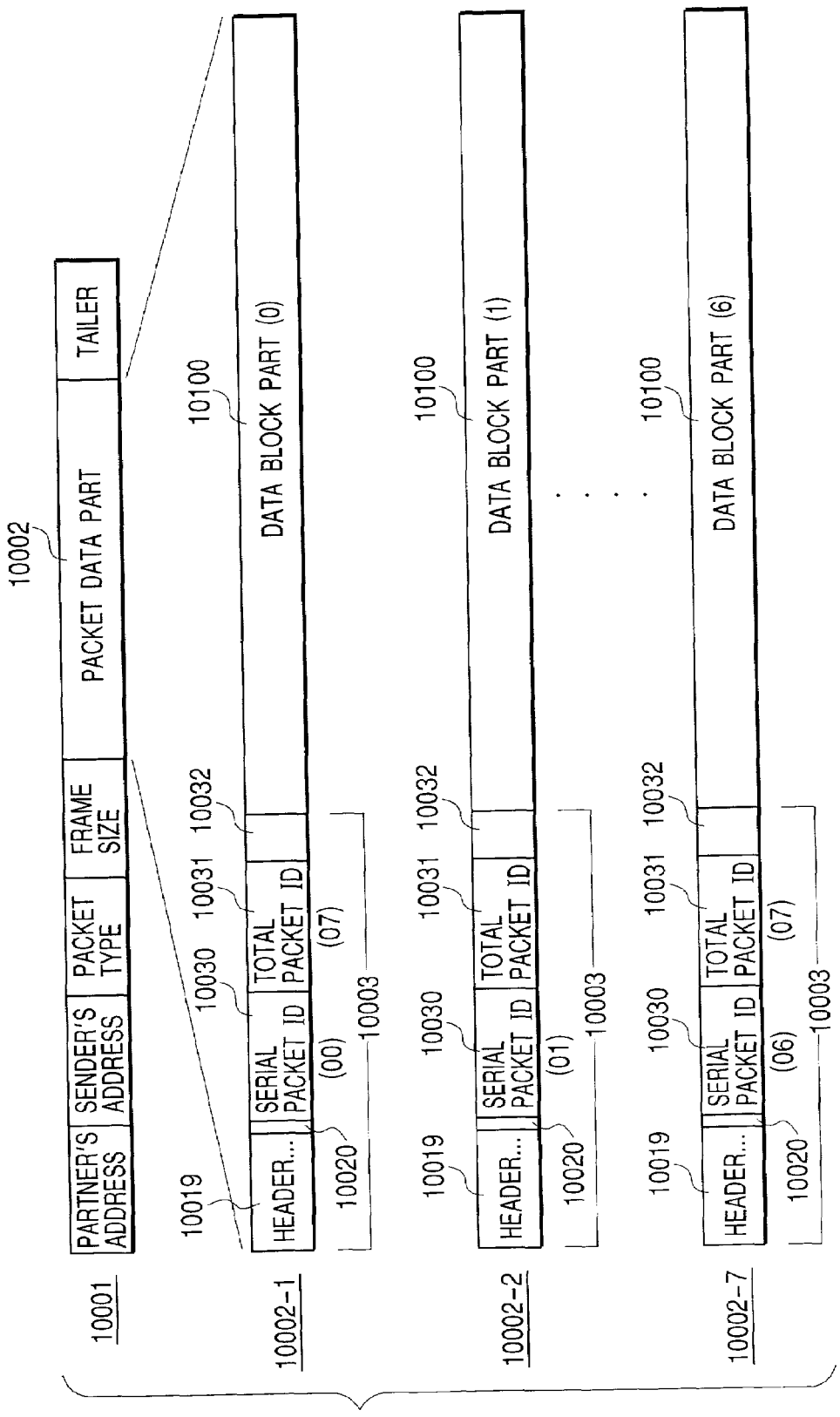
FIG. 9 is a diagram for explaining the structure of the network packet used for performing the communication on the network on which the client computers and the image server shown in FIG. 1 are connected each other.

FIGS. 7 to 9 are diagrams for explaining a structure of a network packet for communication on the network to which the client computer 400 and the image server 200 both shown in FIG. 1 are connected.

On the network 1 to which the client computer 400 and the image server 200 are connected, aggregation of data strings called the packet as shown in FIGS. 7 to 9 is mutually exchanged by using one block.

The packet (a packet base 10001) includes a transmission partner's network address (called a partner's address) at the head, a transmitter's network address (called a sender's address), a packet type, a frame size of the packet, actual packet data (called a packet data part 10002), and an error check such as CRC (cyclic redundancy check) or the like (called a tailer) in due order.

Although arbitrary data can be set as the packet data part 10002, in the embodiment the packet data part 10002 is divided into a header part 10003 and a data block part 10100 as shown in FIGS. 7 to 9.

As shown in FIG. 7, the header part 10003 of the packet data part 10002 includes at the head a header code 10019 representing the header information, a function code part 10020 representing what kind of function this packet data has, a serial packet ID 10030 representing a serial number in a case where one data is constituted by the plural packets, a total packet ID 10031 representing the number of total packets in this case, and a data length 10032 representing the data length of the data block part 10002 in which the actual data is set.

Further, the function code part 10020 includes a function ID 10021 representing the type of image server, a job type ID 10022 representing the type of job for the image server, and a job ID 10023 discriminating the job to be executed.

Next, as shown in FIG. 8, the data block part 10100 of the packet data part 10002 is divided into a command block 10005, a status block 10006, an image data block 10007 and an image information block 10008, in accordance with the contents of the uniquely determined job type ID 10022 of the function code part 10020 of the header part 10003.

In a case where the print information sent from the client computer is represented by a specific PDL, such a command is set in the command block 10005 and sent, while the image data block and the image information block are not sent.

Further, in a case where the plural packets constitute one data, the packet data part 10002 is composed of plural packet data parts 10002-1 to 10002-7 as shown in FIG. 9.

Figure 10:
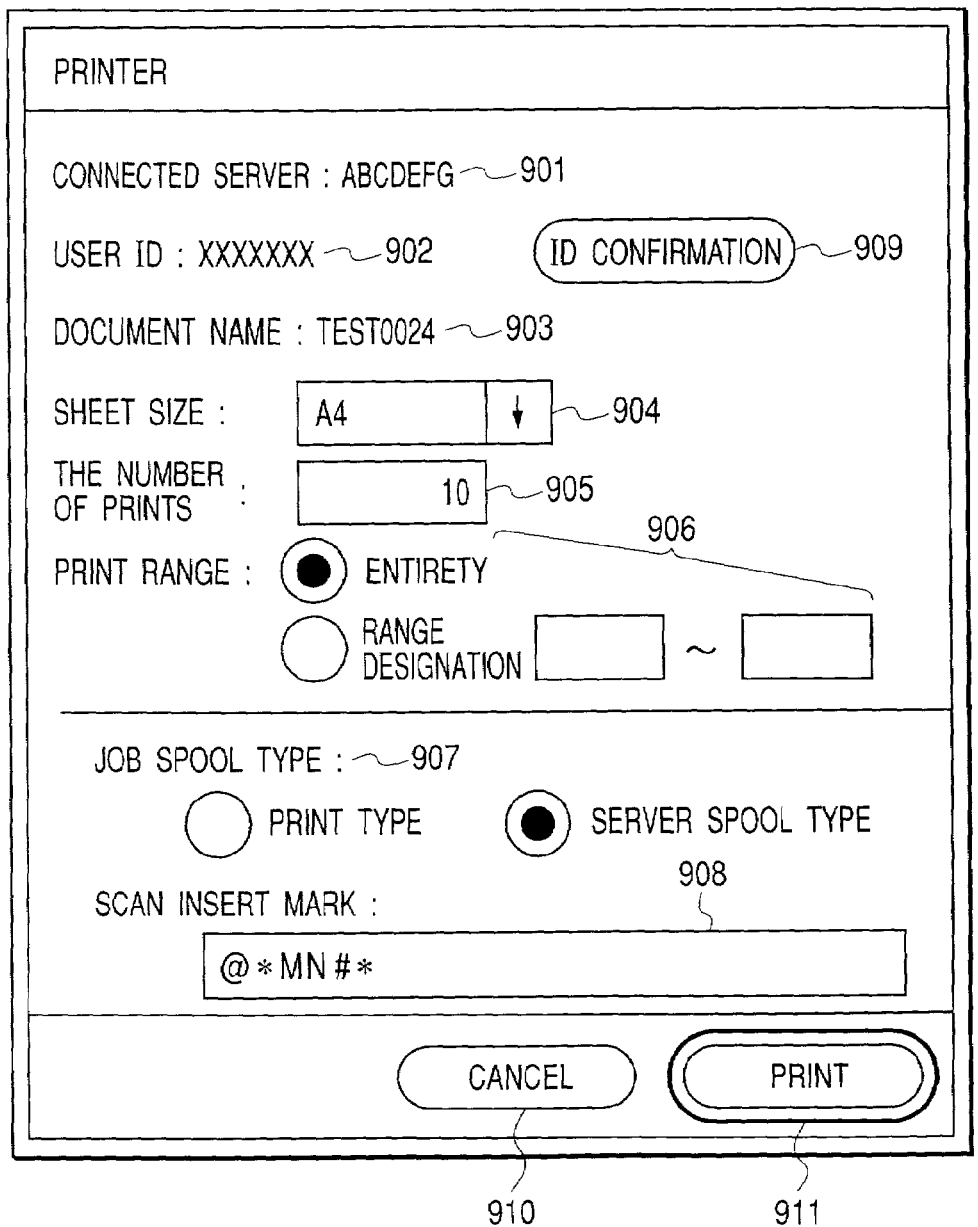
FIG. 10 is a schematic diagram showing a printer dialogue screen displayed on a display by a printer driver on the client computer.

FIG. 10 shows a printer dialog screen which is displayed on the color display 412 by the printer driver on the client computer 400.

In FIG. 10, numeral 901 denotes a section in which an image server name uniquely determined and currently connected is displayed. Numeral 902 denotes a section in which a user ID uniquely determined is displayed. Numeral 903 denotes a section in which a document name of the original to be printed hereafter is displayed. Numeral 904 denotes a list box by which a sheet size to be printed hereafter is selected, numeral 905 denotes a section in which the number of prints is input, and numeral 906 denotes a section in which a print range is set. Concretely, in the section 906, the entirety or the partial range of the page to be printed is designated such that the print operation can be performed in the designated range.

Numeral 907 denotes a section in which a job spool type is selected and set from "print type" and "server spool type". In the case where "print type" is designated, the print job of the designated original is executed as it is. Thus, the designated original is directly printed by the printer connected through the designated image server, and the print job ends. On the other hand, in the case where "server spool type" is designated, the print job of the designated original is once stored in the image server.

Numeral 908 denotes a section in which a scan insert mark which is the important thing in the present invention is set.

As the scan insert mark, an arbitrary character string can be designated. Namely, in a document which was created by an application for managing an arbitrary text, the scan insert mark is written on the part of page into which a page of an externally scanned and input document is intended to be inserted. Thus, an arbitrary scan insert original can be inserted to the target page in the posterior image server. In any case, the scan insert mark will be later described in detail.

Numeral 909 denotes an ID confirmation button. When the ID confirmation button 909 is depressed (or appointed by the mouse 431 or the like), the connected server and the user ID being the current targets can be confirmed, and the connected server can be changed to another image server.

Numeral 910 denotes a cancel button by which execution of the print is canceled. Numeral 911 denotes a print execution button. When the print execution button 911 is depressed, the print operation is started with the contents set on the printer dialog screen of FIG. 10, whereby the conversion into the PDL is started by the printer driver. Namely, the printer driver performs data conversion from the internal command normally supported on a particular OS (operating system) into the PDL supported by the printer and the image server.

Hereinafter, a procedure in the case where the process using the above insert mark is performed will be explained by enumerating an example. First, before the print setting on the printer dialog screen of FIG. 10 is performed, the document being the target to which the process using the insert mark is performed is previously created in a preprocedure with use of application software by the client computer 400.

Figure 19:
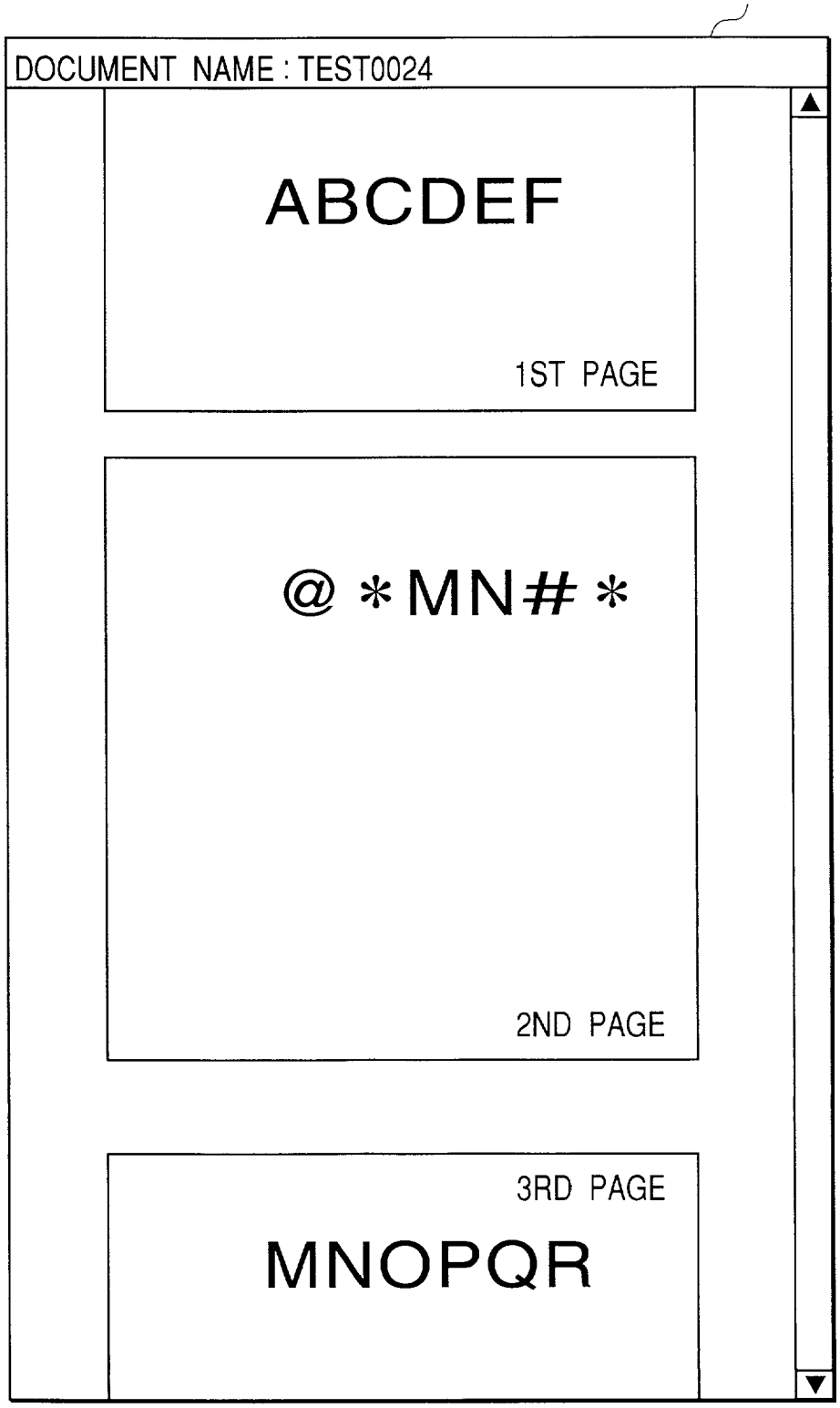
FIG. 19 is a schematic diagram showing a document creating software screen displayed on the display on the client computer.

FIG. 19 shows an application screen on which text is handled and which is displayed on a display 412 of the client computer 400. A user creates the document on the client computer by using the keyboard 441 and/or the mouse 431. In the example of FIG. 19, the document named "TEST0024" including at least originals of three pages is being created. A character string "ABCDEF" is written on the first page, and a character string "MNOPQR" is written on the third page. Then, it is assumed that the user is creating the original of the second page by using the keyboard 441, the mouse 431 and the like.

If a character string "@*MN#*" is written on the second page by using the keyboard 441, this arbitrary character string "@*MN#*" written by the user corresponds to the insert mark.

After the document was created on the screen of FIG. 19 by the user, the printer dialog screen of FIG. 10 is opened on the display 412.

Then, on the print setting screen (i.e., the printer dialog screen) of FIG. 10, the document created on the screen of FIG. 19 is input in the so-called document name display section 903 as the document to be printed (document name "TEST0024"), and other various settings (sheet size setting, setting for the number of prints, print range setting, spool type selection, etc.) are performed. Further, the character string same as the character string "@*MN#*" previously written in the second page of the original on the screen of FIG. 19 is input to the so-called scan insert mark setting section 908 by the user with the keyboard 441. Then, when the print execution button 911 is depressed, the print data based on the driver setting is created and output to the side of the image formation apparatus (i.e., the digital color copying machine 1000). On the other hand, the copying machine 1000 performs, in the unit of page, an insertion process of the document data created by the client computer into the image data of the originals read by the scanner 100 of the copying machine 1000. Thus, an output result as shown in FIG. 20C can be obtained.

FIG. 20A shows the document of FIG. 19 created by the client computer. Here, it is assumed that the number of pages of the document created by the client computer is "M". The first and third pages (i.e., the pages on which the insert mark has not been written) are the pages on which the data to be printed have been written, and the second page is the page which includes the character string (i.e., the insert mark "@*MN#*") arbitrarily determined by the user himself.

FIG. 20B shows the originals which are to be inserted into the print data created by the client computer. It should be noted that these originals are input through the scanner 100 of the image formation apparatus. In this example, on the image formation apparatus side, the sheaf of the originals of "N" pages including the original on which a character string "GHIJKL" has been written is prepared as the originals to be inserted.

Then, the image formation apparatus (or the image server) analyzes the print data from the client computer for each page. Thus, according as the page on which the insert mark has been written (i.e., the second page in this example) is detected, an insert process is performed such that the page represented by the image data of the original read by the scanner is inserted into the part of page including the insert mark. Namely, the page including the insert mark is replaced with the page represented by the image data of the original read by the scanner. Thus, as shown in FIG. 20C, it is possible to print the output result of M pages which is obtained by gathering as one document the data from the client computer and the data from the scanner. It should be noted that a series of the data gathered as one document can be stored as electronic data in the memory on the image server, without printing it.

The insert mark is the command data which is used to instruct to insert the page of the image data from the scanner into the part of page including the insert mark, but is not the data which is to be actually formed on a recording sheet. Therefore, the insert mark which is displayed on the client computer as if it has been written on the original (see FIG. 20A) is not actually printed on the recording sheet when the image formation on the recording sheet is performed by the image formation apparatus (see FIG. 20C).

Figure 11:
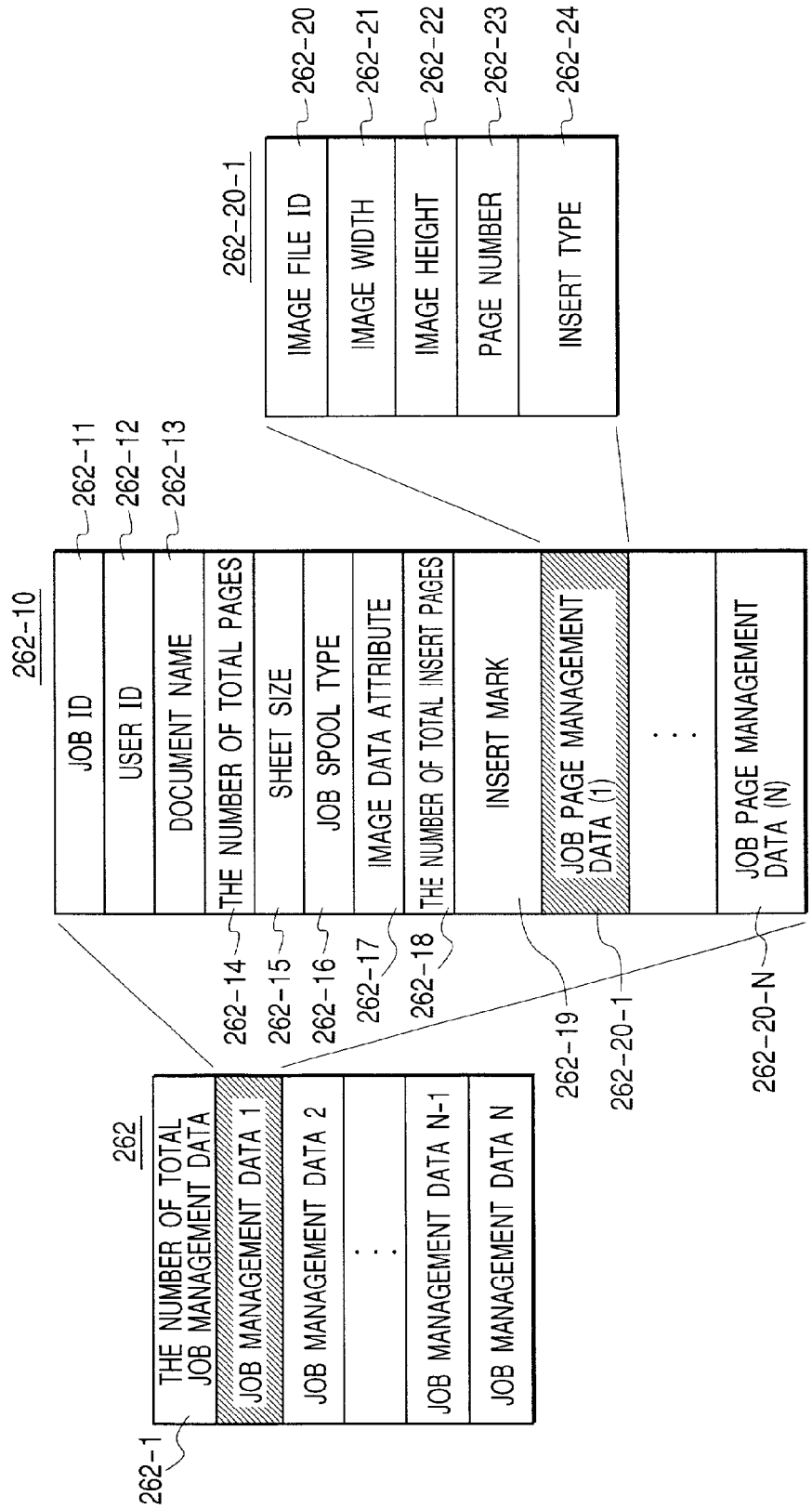
FIG. 11 is a diagram showing the structure of a job management table managed by a main controller in the image server shown in FIG. 5.

FIG. 11 shows a structure of the job management table which is controlled by the main controller 210 of the image server 200 shown in FIG. 5. It should be noted that the job management table is stored in the main memory 260.

In FIG. 11, numeral 262 denotes the job management table which is composed of the number of total job management data 262-1 and job management data 262-10. As the job management data 262-10, there are job management data 1 to N of which the number corresponds to the number of total job management data 262-1.

The job management data 262-10 is composed of an job ID 262-11, a user ID 262-12, a document name 262-13, the number of total pages 262-14, a sheet size 262-15, a job spool type 262-16, an image data attribute 262-17, the number of total insert pages 262-18, an insert mark 262-19, and job page management data (1) 262-20-1 to jog page management data (N) 262-20-N. It should be noted that the management data includes, e.g., the data based on the contents set by the user on the setting screen shown in FIG. 10.

Each of the job page management data (1) 262-20-1 to the job page management data (N) 262-20-N is composed of an image file ID 262-20, an image width 262-21 representing the image size, an image height 262-22, a page number 262-23, and an insert type 262-24.

FIGS. 12A and 12B show an example of scan insert processing screens displayed on the operation panel by the operation panel controller 106 of the scanner shown in FIG. 2. Concretely, FIG. 12A corresponds to a job selection screen by which the job corresponding to the scan insert process is selected, and FIG. 12B corresponds to a type setting screen by which the type of scan insert process is designated.

In the job selection screen of FIG. 12A, numeral 801 denotes a job selection list by which the job corresponding to the scan insert process is selected, and numeral 802 denotes a cancel button which is depressed to cancel the scan insert process. Numeral 803 denotes an OK button which is depressed to make the selection in the job selection list 801 effective. The jobs to be selected are the print jobs which were sent from the client computers registered in the raster image storage unit 700 of the image server, and have been previously instructed on the client computer side through the setting screen of FIG. 10 or the like as the jobs to be subjected to the insert process.

On the type setting screen of FIG. 12B, the information representing the job selected on the job selection screen of FIG. 12A is displayed. In this example, a document of which the job number is "244" and the document name is "Doc-9869" has been selected, and the number of pages "100" and the user ID "000021" are displayed as the information of this document. Further, the number of total insert mark pages is displayed to indicate how many pages on which the insert mark has been written exist in the document created on the client computer. In this case, it is indicated that 38 pages on which the insert mark has been written exist in the original of 100 pages. Namely, the 38 pages in the original including the 100 pages are replaced with the pages represented by the image data sent from the scanner. Further, together with such the information, the scan insert mark "@*MN#*" set on the setting screen of FIG. 10 is displayed for this job. Such the information is managed in the main memory 260, and captured and displayed by reading the information of the job management data 262-10 shown in FIG. 11.

On the type setting screen shown in FIG. 12B, numeral 804 denotes a type selection section in case of executing the insert operation. The user selects one of following two insert execution types in the type selection section 804. The first type which is called "scan insert at each print" type corresponds to a function that the insert original prepared by the user is inserted into the document every time the print operation is performed (i.e., a function that the data from the client computer and the data from the scanner are gathered as one document based on the insert mark and the print operation is performed in such a state).

The second type which is called "insert and store in designated job" type corresponds to a function that the insert original set by the user is scanned with respect to the document previously registered in the raster image storage unit 700 and again registered as the raster image of the insert target page part (i.e., a function that the data from the client computer and the data from the scanner are gathered as one document based on the insert mark and such the gathered data is registered in such a state). By using this function, in the document named "Doc-9869" shown in FIG. 12B, the data corresponding to the 38 pages of total 100 pages are rewritten by the data from the scanner and the rewritten data is again registered (i.e., updated) in the raster image storage unit 700. Thus, since the insert original is registered together with other pages in the image server, a reprint operation can be easily performed.

Numeral 805 denotes a button which is called a "delete job after execution" button. When the process of the above first type is selected at the type selection section 804 in case of executing the insert process, it is designated by the button 805 whether or not the target job (the document named "Doc-9869" in this example) should be deleted from the image server after the insert process was executed or performed.

Numeral 806 denotes a cancel button which is depressed to cancel the scan insert process, and numeral 807 denotes an OK button which is depressed to make the setting on the type setting screen effective.

<Explanation of Flow Charts>

Hereinafter, operations in the print process of the image server system to which the server apparatus and the image processing apparatus according to the present invention are applicable will be explained with reference to flow charts shown in FIGS. 13 to 17.

Figure 13:
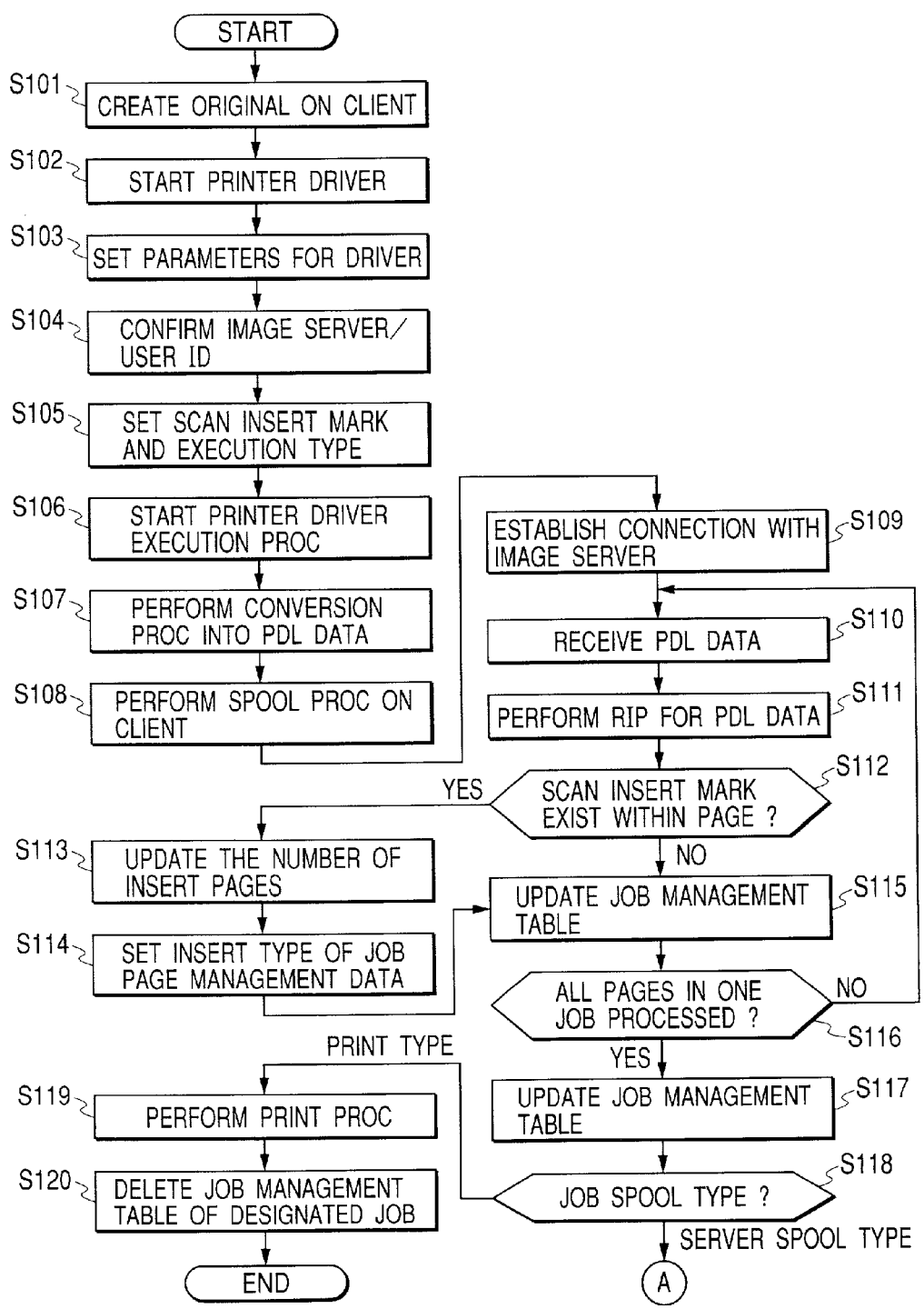
FIG. 13 is a flow chart showing a first control processing procedure executed in the image server system to which the server apparatus and the image processing apparatus of the present invention are applicable.
Figure 14:
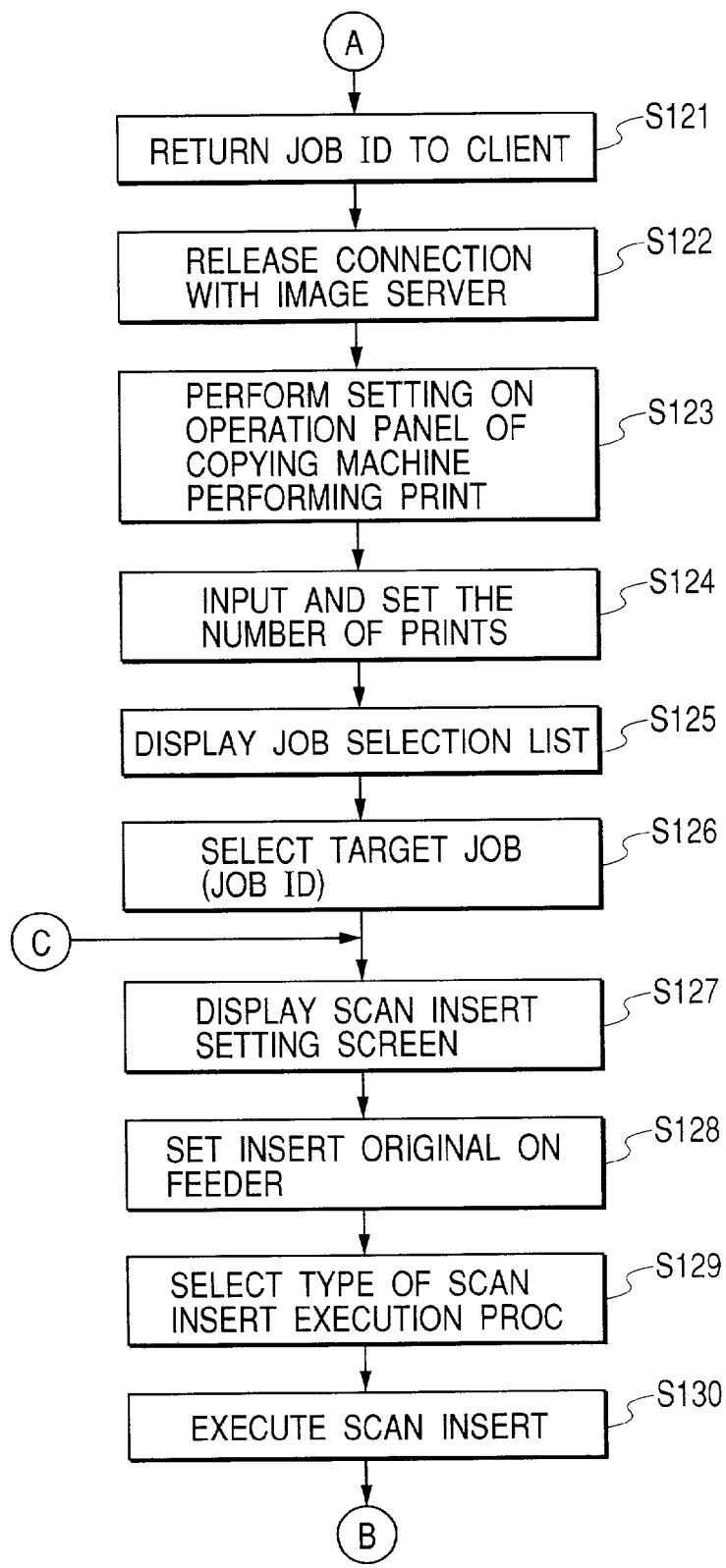
FIG. 14 is a flow chart showing the first control processing procedure executed in the image server system to which the server apparatus and the image processing apparatus of the present invention are applicable.
Figure 15:
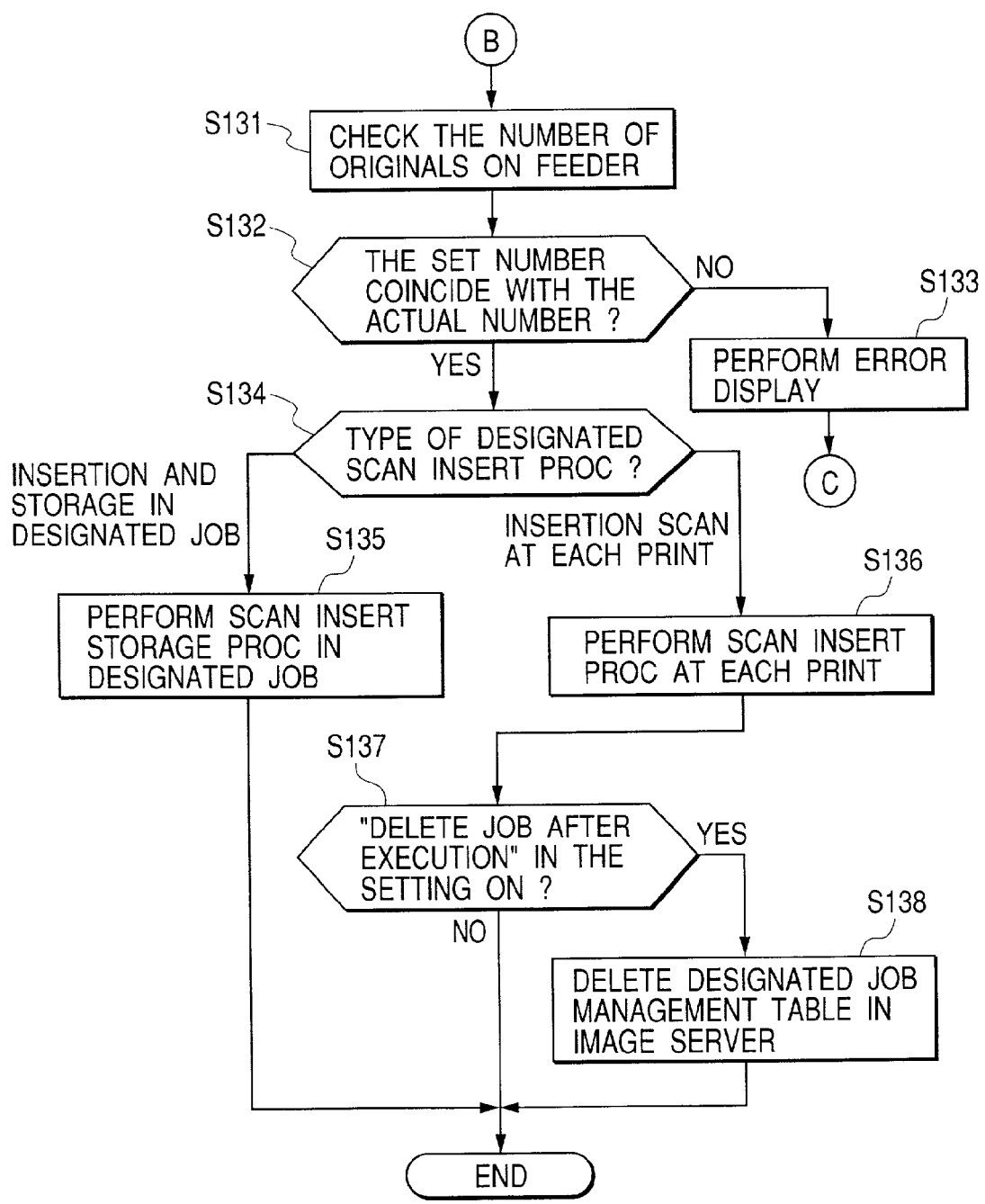
FIG. 15 is a flow chart showing the first control processing procedure executed in the image server system to which the server apparatus and the image processing apparatus of the present invention are applicable.

FIGS. 13 to 15 are the flow charts showing an example of a first control processing procedure in the image server system to which the server apparatus and the image processing apparatus according to the present invention are applicable. It should be noted that the first control processing procedure corresponds to a print processing procedure, and symbols S101 to S138 in FIGS. 13 to 15 denote respective steps.

First, in the step S101, on the client computer 400, the arbitrary software is loaded by the user from the hard disk 451 to the main memory 460. Thus, the original is created by the CPU 405 according to the loaded software (e.g., the original shown in FIG. 19), and the flow advances to the step S102.

In the step S102, when this created original is printed, the user selects the designated printer driver and starts it operating.

Next, in the step S103, the printer dialog screen shown in FIG. 10 is displayed on the display 412 by the started printer driver. The information necessary for the print operation is set on the displayed printer dialog screen.

First, parameters for the drive are set. At this time, the uniquely determined name of the currently connected image server, the uniquely determined user ID, the name of the document to be printed hereafter, the size of the sheet on which the document is printed, and the number of prints are set. Further, the print page range is designated to be able to print the designated pages. In the step S104, the ID confirmation button 909 is depressed to confirm or change the current target (the connected server and the user ID).

Next, in the step S105, the job spool type based on the information input through the so-called job spool type setting section 907 is set, and the scan insert mark based on the information input through the scan insert mark setting section 908 is set. As the scan insert mark, the arbitrary character string (e.g., "@*MN#*") can be designated by, e.g., the keyboard 441 of the client computer or the like. Namely, in the document which was created by the application for managing the arbitrary text, the scan insert mark is written on the part of page (i.e., the second page in the example of FIGS. 19 to 20C) into which the page of the externally scanned and input document is intended to be inserted Thus, the arbitrary scan insert original can be inserted to the target page in the posterior image server. As described above, the arbitrary character string to be input to the scan insert mark setting section 908 is the same character string as that written in the document being the target for the insert process created by the client computer and to be used as the insert mark.

The job spool type can be selected through the job spool type setting section 907 from the two types "print type" and "server spool type". In case of "print type", the print job of the designated original is executed as it is. Thus, the designated original is directly printed by the printer connected through the designated image server, and the print job ends.

On the other hand, in case of "server spool type", the print job of the designated original is once stored in the image server.

After ending the setting in the steps S103 to S105, in the step S106, the print execution button 911 is depressed by the user to start the printer driver performing the print process.

In the step S107, the printer driver starts to perform a conversion process to the PDL. Namely, the printer driver performs the data conversion from the internal command normally supported on the particular OS into the PDL supported by the printer and the image server. Then, in the step S108, a spool process is performed on the client computer, and the flow advances to the step S109.

In the step S109, the printer driver causes the network controller 420 to perform communication with the network controller 220 of the image server 200.

In this communication between the client computer 400 and the image server 200, the network address of the designated image server is picked up from the ID table 452 of the network address of the image server previously registered in the client computer, the partner's address in the packet base 10001 shown in FIGS. 7 to 9 is set by the network controller 420, and the job ID of the print job uniquely determined as an ID to discriminate the function is set to the function ID 10021 of the header part 10003, whereby it is specified that the print operation is to be performed. Further, the uniquely determined ID representing the command data block is set as the job type ID. At this time, the user ID, the document name, the sheet size for print, the number of prints, the job spool type, the scan insert mark and the like which are the various print parameters set on the print dialog screen are set in the data block part 10100.

The client computer 400 transfers the packet data to the image server 200 through the network controller 420, whereby the connection between the client computer 400 and the image server 200 is established.

<Process on Image Server 200>

At the time when the above connection is established, the main controller 210 of the image server registers the job ID and the user ID, the document name, the sheet size for print, the number of prints, the job spool type, the scan insert mark and the like being the various print parameters sent from the transferred command packet part, to the job management table 262 having the structure as shown in FIG. 11.

The main controller 210 counts up the number of total job management data 262-1 of the job management table 262, retrieves the vacant job management data 262-10, and sets its ID value to the job ID 262-11 and the user ID 262-12 in the job management data 262-10.

After then, the PDL command to which the conversion of one page has ended first is transmitted as the command data block from the client side to the image server.

In the step S110, on side of the image server 200, the contents of the packet are separated into the header part 10003 and the data block part 10100 by the main controller 210. Then, if it is analyzed that the content of the data block part 10100 is the PDL command (i.e., if the PDL data is received), the image data of one page is created from the PDL data by the RIP 290 in the step S111, and then the flow advances to the step S112.

In the step S112, the scan insert mark in the job management data (this data is based on the data input through the scan insert mark setting section 908 on the setting screen of FIG. 10) is compared with the character string in the PDL by the RIP 290 to judge whether or not the character string same as the scan insert mark 262-19 exists in the page. If judged that the character string same as the scan insert mark 262-19 exists in the page, the flow advances to the step S113. In the example of FIGS. 19 to 20C, if judged that the character string same as the character string input in the scan insert mark setting section 908 on the setting screen of FIG. 10 exists in the second page of the document created by the client computer, the flow advances to the step S113. In the step S113, the number of total insert pages 262-18 in the job management data 262-10 is updated. Then, in the step S114, the insert type 262-24 in the job page management data (1) 262-20-1 of the job management data 262-10 is set to be a "scan insert necessary" type uniquely determined previously. In the step S115, the image file ID is considered to be null, whereby the ID representing that the image file is not yet established is set. Further, provisional values are set only as the image data size and the page number to update the job page management data, and the flow advances to the step S116.

Conversely, if judged in the step S112 that the scan insert mark does not exist in the page (corresponding to the first or third page of the document created by the client computer in the example of FIGS. 19 to 20C), the flow advances to the step S115. In the step S115, the image data of one page created by the RIP 290 is registered as the image file in the raster image memory 760. At this time, the uniquely determined image file ID is set to the image file ID 262-20 in the job page management data (1) 262-20-1 of the job management table, the size of the registered image data is stored as the image width 262-21 and the image height 262-22, and also the page number thereof is stored as the page number 262-23, whereby the job page management data is updated.

Next, in the step S116, it is judged whether or not all the pages (corresponding to the M pages in the example of FIGS. 19 to 20C) in one job have been processed. If judged that all the pages are not yet processed, the flow returns to the step S110, while if judged that all the pages have been processed, the flow advances to the step S117.

As described above, in the case where there are the plural pages, the converted PDL command of next one page is further transmitted as the command data block from the client computer to the image server, and then the process same as above is repeated plural times corresponding to the number of designated pages, whereby the image data (i.e., the image files) corresponding to the number of designated pages are stored in the raster image memory 760.

In the step S117, the job management table 262 is updated, and the flow advances to the step S118.

In the step S118, the main controller 210 retrieves the type of the job spool type 262-16 in the job management data 262-10. If the retrieved type is "print type", the flow advances to the step S119 to perform the ordinary print process. In this ordinary print process, as described above, the layout controller 750 performs the layout operation for the plural registered image data (i.e., the image data stored in the raster image memory 760) according to the instruction from the main controller 210, and outputs the obtained data to the color printer 300 of the digital color copying machine

1000 through the color digital interface controller 790, whereby the color print image can be obtained. At this time, the page corresponding to the insert page (i.e., the second page of the document created by the client computer in the example of FIGS. 19 to 20C) is print-output as a blank sheet only having its page number (i.e., the insert mark is not printed on this sheet).

Next, in the step S120, the main controller 210 retrieves and deletes the job of the target job and user ID's in the job management table on the basis of the command.

On the other hand, if it is judged by the main controller 210 in the step S118 that the retrieved type is "server spool type", the above print process is not performed, but the flow advances to the step S121. In the step S121, the user and job ID's received through the network controller 220 are set as status information data to the data block part 10100 of the packet data, the job type ID 10023 in the header is set to be the uniquely determined ID of the status block, and this ID is returned to the client computer 400. Thus, in the step S122, the connection between the client computer 400 and the image server 200 is released.

When it is necessary to print the document information registered before in the image server, in the step S123 the user handles the operation panel/touch sensor 107 on the spooled digital copying machine connected to the image server with the separately prepared insert original in accordance with such necessary output.

In this case, the insert original in which the pages previously created on the client computer are arranged in the order for which insertion is necessary is prepared (see FIG. 20B).

In the step S124, the user first sets the number of necessary prints on the operation panel/touch sensor 107 of the digital color copying machine. After the number necessary prints was set, the item of scan insert process is depressed. Thus, the operation panel controller 106 confirms that such the item was selected, and then instructs the scanner controller 101 to create the job selection list.

The scanner controller 101 sends a uniquely predetermined job list request command to the main controller 210 of the image server 200 through the interface controller 104, and thus the main controller 210 retrieves the job management table 262. Namely, with respect to the job currently registered/stored in the raster image storage unit 700, the main controller 210 retrieves from the job management table 262 the job ID, the document name, the number of total pages, the user ID, the number of total insert pages and the insert mark, creates the job selection list based on the retrieved data, and then sends the created list to the scanner controller 101.

Next, the scanner controller 101 receives the job selection list from the main controller 210, and displays the operation screen for the received job selection list (i.e., the job selection screen shown in FIG. 12A) on the operation panel/touch sensor 107 in the step S125.

Next, in the step S126, the user selects the target job from the job selection list 801, and depresses the OK button 803.

Next, in the step S127, the operation panel controller 106 displays the setting screen for designating the scan insert execution type (i.e., the type setting screen shown in FIG. 12B) on the operation panel/touch sensor 107.

With respect to the job selected before on the job selection screen, the job number, the document name, the number of total pages, the user ID, the number of total insert pages, and the insert mark corresponding to the selected document are displayed on the type setting screen. The user selects one of the following two insert execution types.

The first type which is called "scan insert at each print" type corresponds to the function that the insert original prepared by the user is inserted into the document every time the print operation is performed.

The second type which is called "insert and store in designated job" type corresponds to the function that the insert original set by the user is scanned with respect to the document registered before in the raster image storage unit and the scanned original is again registered as the raster image of the insert target page part. Thus, since the insert original is registered together with other pages in the image server, the reprint operation can be easily performed.

In the step S128, a sheaf of the insert originals is set on the stack tray 1201 of the feeder 1200 of the digital copying machine. By adjusting the guides to the original, the width of the original in the width direction can be detected.

Next, in the step S129, one of the above two scan insert execution types is selected. Here, after the process of "scan insert at each print" type was performed, it is possible by the button 805 to designate whether or not the target job should be deleted from the image server.

Next, in the step S130, the OK button 807 on the panel is depressed to start the scan insert process.

<Check of the Number of Originals on Feeder>

In the step S131, the number of originals on the feeder is checked. In this process, an instruction to set the recycle lever 1209 is sent to the scanner controller 101 and the feeder controller 105 of the digital color copying machine 1000. The scanner controller 105 sets the recycle lever 1209 to the uppermost part of the sheaf of the originals on the stack tray 1201, and returns a setting end code to the main controller 210 of the image server 200.

Next, the scanner controller 101 issues an instruction to set the lowermost one of the originals in the sheaf to the exposure start position of the platen glass 131. The feeder controller 105 sets the original on the platen glass 131 in accordance with the above processes. At this time, the width sensor 1212 disposed in the path I detects the width of the original in the feed direction and counts the number of passed originals.

After then, the original on the platen glass 131 is returned to the uppermost part of the sheaf through the paths III, V and VI in due order.

When the recycle lever 1209 completely falls on the stack tray 1201 by its own weight, it is judged by the feeder controller 105 that the count for all the originals ends. Then, the number of total originals is transferred to the scanner controller 101.

At this time, in the step S132, it is judged by the scanner controller 101 whether or not the counted number coincides with the number of total insert pages 262-18. If judged that the counted number does not coincide with the number of total insert pages, the flow advances to the step S133 to display an error message on the operation panel/touch sensor 107, and the flow returns to the step S127 to again display the setting screen for again designating the scan insert execution type (FIG. 12B) on the operation panel/touch sensor 107.

Conversely, if judged in the step S132 that the counted number coincides with the number of total insert pages 262-18, the flow advances to the step S134 to judge the type of discriminated scan insert process. If judged as the scan insert storage in the designated job, the flow advances to the step S135 to perform the scan insert storage process (shown in FIG. 17 in detail) in the designated job, and the process ends.

Conversely, if judged in the step S134 as the scan insertion at each print, the flow advances to the step S136 to perform the scan insert process (shown in FIG. 16 in detail) at each print, and the flow further advances to the step S137.

In the step S137, it is judged whether or not the "delete job after execution" button 805 to designate whether or not the preset target job should be deleted from the image server is ON. If judged that the button 805 is ON, the flow advances to the step S138. In the step S138, the scanner controller 101 transmits a designated job deletion command to the main controller 210 of the image server 200. In response to this command, the main controller 210 retrieves and deletes the job of the target job and user ID's in the job management table on the basis of this command, and the process ends.

On the other hand, if judged in the step S137 that the "delete job after execution" button 805 is not ON, the process ends as it is.

<Scan Insertion at each Print>

Figure 16:
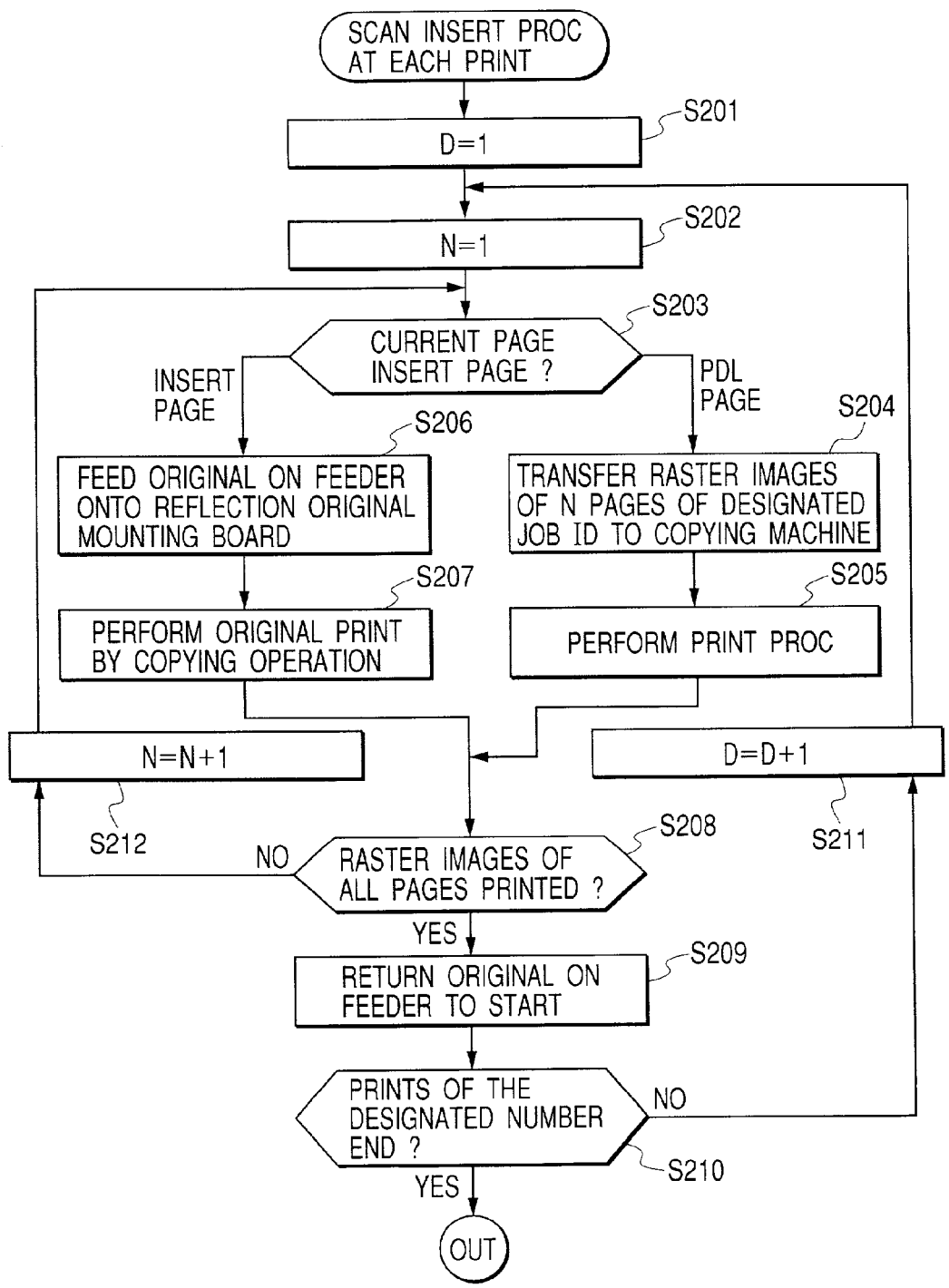
FIG. 16 is a flow chart showing a second control processing procedure executed in the image server system to which the server apparatus and the image processing apparatus of the present invention are applicable.

FIG. 16 is a flow chart showing an example of a second control processing procedure in the image server system to which the server apparatus and the image processing apparatus according to the present invention are applicable. It should be noted that the second control processing procedure corresponds to the scan insert process at each print in the step S136 of FIG. 15, and symbols S201 to S212 denote respective steps.

First, in the step S201, "1" is substituted for a variable D representing the number of prints in the designated job, to initialize the variable D. In the step S202, "1" is substituted for a variable N representing the number of pages for each print in the job, to initialize the variable N.

Next, in the step S203, it is judged by the main controller 210 of the image server 200 whether or not the current page is the insert page, and the judged result is notified to the color scanner 100 of the color digital copying machine 1000. Such the judgment process is based on whether or not the insert type 262-24 in the job page management data (1) 262-20-1 of the current page is set to be the "scan insert necessary" type.

If judged in the step S203 that the current page is the insert page (the insert type 262-24 in the job page management data (1) of the job management data 262-10 is set to be the "scan insert necessary"type), the flow advances to the step S206. In the example of FIGS. 19 to 20C, the second page corresponds to this insert page. In the step S206, based on the original feed procedure of the feeder 1200 shown in FIG. 3, the original (e.g., the original of "GHIJK" shown in FIG. 20B) is fed onto the platen glass 131. At the time when the fed original is set on the platen glass 131 (if the scanner 100 notifies the main controller 210 of this setting), the main controller 210 issues a scanner input trigger to the color scanner 100 of the color digital copying machine 1000 through the color digital interface controller 790 in the step S207. Thus, the scanner 100 inputs the original as R (red), G (green) and B (blue) image data, and the printer 300 prints the input color image data as the insert original. The printed insert original is output to the tray 324, and the flow advances to the step S208.

Conversely, if judged in the step S203 that the current page is not the insert page, i.e., the page on which the PDL image unnecessary to be inserted has been developed (e.g., corresponding to the first or third page of FIG. 20A in which no insert mark is included), the flow advances to the step S204. In the step S204, the scanner controller 101 issues a print execution command to the main controller 210 of the image server 200 through the interface controller 104, to print the image file of the target page.

The main controller 210 of the image server 200 which received the print execution command retrieves the image file ID 262-20 of the job page management data of the job target pages (N pages of the designated job ID) in accordance with the above print procedure, obtains as the print data the image data (raster image) from the target image file through the memory management controller 720, and transfers the print data to the scanner controller 101 of the digital color copying machine through the interface controller 104. In the step S205, the print process is performed through the printer controller 301, and the flow advances to the step S208.

In the step S208, it is judged whether or not the raster images of all the pages have been printed. If judged that the raster images of all the pages are not yet printed, the flow advances to the step S212 to perform increment of the variable N, and the flow returns to the step S203.

Conversely, if judged in the step S208 that the raster images of all the pages have been printed, the flow advances to the step S209.

In the step S209, the feeder originals are returned to the start, and the flow advances to the step S210 to judge whether or not the print of the designated number ends. If judged that the print of the designated number does not end, the flow advances to the step S211 to perform increment of the variable D, and the flow returns to the step S202.

Conversely, if judged that the print of the designated number ends, the flow advances to the step S137 of FIG. 15.

As described above, the main controller 210 performs the processes in the steps S203 to S207 for all the pages, and repeats such a series of processes plural times designated by the user.

At the time when the print of all the copies ends, the insert original on the platen glass 131 is returned to the uppermost part of the sheaf through the paths III, V and VI in due order.

By the above processes, it is possible to later add the arbitrary insert original to the previously determined document, whereby it is possible to perform print of arbitrary plural copies as a postprocess.

<Scan Insert Storage Process in Designated Job>

Figure 17:
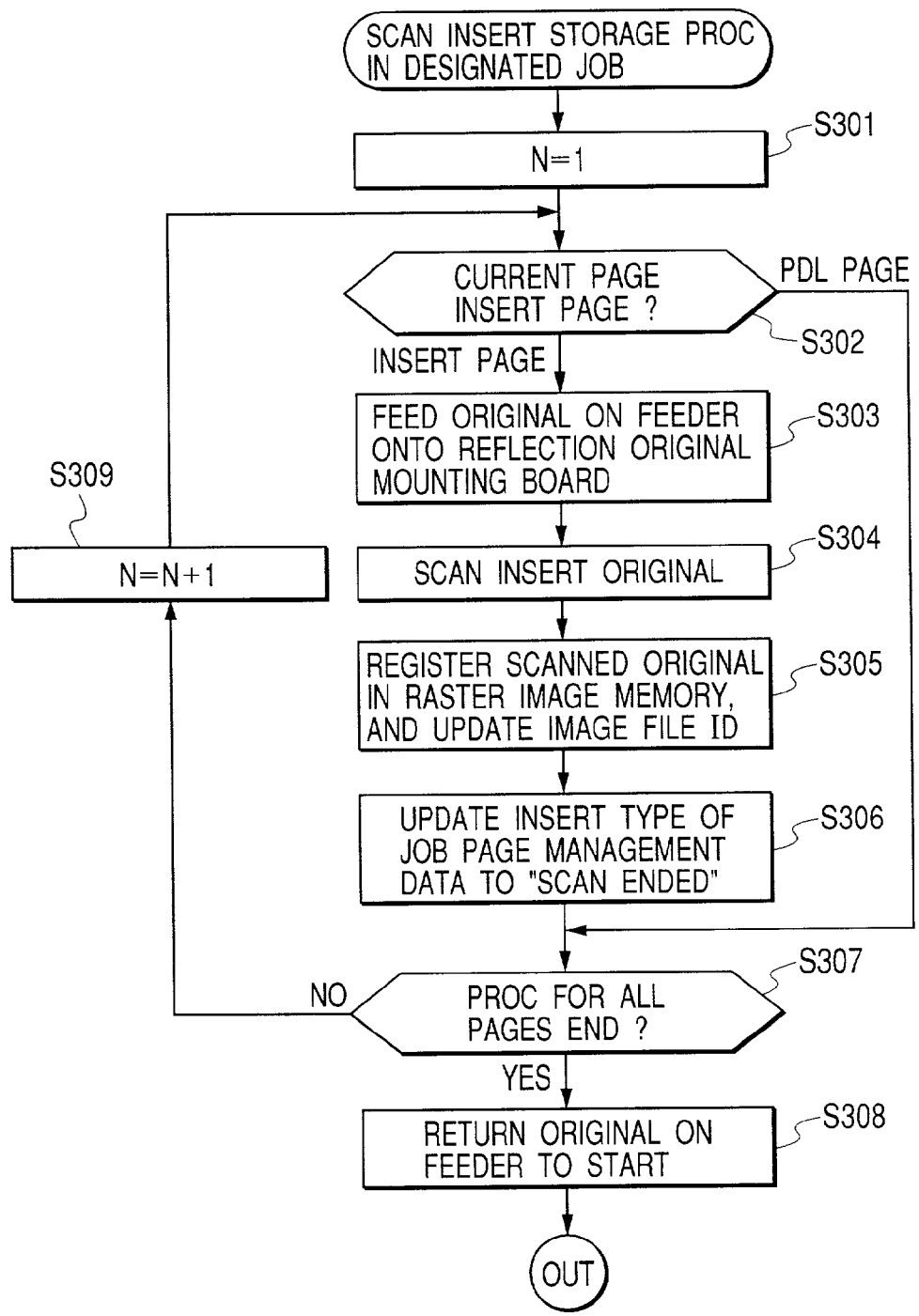
FIG. 17 is a flow chart showing a third control processing procedure executed in the image server system to which the server apparatus and the image processing apparatus of the present invention are applicable.

FIG. 17 is a flow chart showing an example of a third control processing procedure in the image server system to which the server apparatus and the image processing apparatus according to the present invention are applicable. It should be noted that the third control processing procedure corresponds to the scan insert storage process in the designated job in the step S135 of FIG. 15, and symbols S301 to S309 denote respective steps.

First, in the step S301, "1" is substituted for the variable N representing the number of pages in the designated job, to initialize the variable N.

Next, in the step S302, the main controller 210 of the image server 200 judges whether or not the current page is the insert page, and notifies the color scanner 100 of the color digital copying machine 1000 of the judged result. Such the judgment process is based on whether or not the insert type 262-24 in the job page management data (1) 262-20-1 of the job management data 262-10 of the current page is set to be the "scan insert necessary" type.

If judged in the step S302 that the current page is the insert page (i.e., the insert type 262-24 in the job page management data (1) 262-20-1 of the job management data 262-10 is set to be the "scan insert necessary" type), the flow advances to the step S303. In the step S303, based on the original feed procedure of the feeder 1200 shown in FIG. 3, the original (e.g., the original of "GHIJK" shown in FIG. 20B) is fed onto the platen glass 131. At the time when the fed original is set on the platen glass 131 (if the scanner 100 notifies the main controller 210 of this setting), the main controller 210 issues the scanner input trigger to the color scanner 100 of the color digital copying machine 1000 through the color digital interface controller 790 in the step S304. Thus, the scanner 100 inputs the original as the R, G and B image data, and transfers the input data to the image server 200. An arbitrary image file ID is set to the transferred image data, and the image data is then registered as the image file in the raster image memory 760 (step S305). At this time, the before-registered image file ID of the job page management data of the current page being the insert target is reset to the image file ID of the image data transferred from the scanner 100, to change a link destination. Further, the insert type 262-24 is updated to be a uniquely predetermined "scan ended" type (step S306), and the flow advances to the step S307.

Conversely, if judged in the step S302 that the current page is not the insert page, i.e., the page on which the PDL image unnecessary to be inserted has been developed (e.g., corresponding to the first or third page of FIG. 20A in which no insert mark is included), the flow advances to the step S307.

In the step S307, it is judged whether or not the raster images of all the pages have been printed. If judged that the raster images of all the pages are not yet printed, the flow advances to the step S309 to perform increment of the variable N, and the flow returns to the step S302.

Conversely, if judged in the step S307 that the raster images of all the pages have been printed, the flow advances to the step S308.

In the step S308, the feeder originals are returned to the start, and the scan insert storage process in the designated job ends.

As described above, the processes in the steps S302 to S306 are performed for all the pages, the arbitrary scan insert original is later inserted into the part of page including the insert mark designated on the side of the client computer, and the obtained result is stored in the raster image storage unit.

By such a series of processes, the scan insert image is managed together with PDL-expanded images of other pages in the raster image storage unit 700 of the image server, and print of the arbitrary number of copies can be performed at arbitrary timing on the operation panel/touch sensor 107.

Thus, the print image image-expanded from the PDL data created by the client user is once held on the image server, the separately prepared insert original is fed for the print image from the ADF on the copying machine in real time when the print/output of the insert original is performed, and the insert original is freely added and printed to the page predesignated with the specific marking of the print image on the image server. Thus, even for the original not previously digitized on the computer, it is possible by using the another means on the client side to add at arbitrary timing the arbitrary scan insert original to the designated page position of the document including the plural pages without making the raster image of the original data.

Further, on the network, the print image image-expanded from the PDL data created by the client user is once held on the image server, the separately prepared insert original is fed for the print image from the ADF on the copying machine, the insert original is read in the page order, and the raster image of the read insert original is linked with the raster image corresponding to the page predesignated with the specific marking of the print image on the image server. Thus, even for the original not previously digitized on the computer, it is possible by using the another means on the client side to link at arbitrary timing the insert original read by using the scanner function on the image server side with the raster image corresponding to the page predesignated with the specific marking of the print image on the image server, without making the raster image of the original data.

Therefore, it is possible to freely add the insert original later so as to complete the print job.

As described above, in the case where the original is created on the client computer, the page on which the data representing the predetermined instruction for the image formation apparatus (in the embodiment, the instruction to read the scan insert original and insert the page of the read original into the original sent from the client computer) has been written is created beforehand, as a series of originals, together with the page on which the data to be printed (or stored) has been formed, and such the series of originals is output as the print job. On the other hand, on the side of the image formation apparatus, the print job is received, and it is judged whether or not the page in which the data representing the instruction for the image formation apparatus has been written exists in such the series of received originals. Then, with respect to the page in which the instruction for the image formation apparatus is not written, the print data of this page is printed on the recording sheet (or stored in the image server). With respect to the page in which the instruction for the image formation apparatus has been written, the process based on such the instruction (in the embodiment, the process to read the scan insert original, and insert the page represented by the image data of the read original into the original from the client computer) is performed.

In the above embodiment, as the process based on such the instruction, the case where the original is read by the scanner of the image formation apparatus, the read original is inserted into the original sent from the client computer, and the obtained original is printed or registered in the image server as one document was explained. Besides, it is possible to previously prepare a sheet such as a cover, an insert sheet or the like on which an image has been already formed in a sheet feed cassette of the image formation apparatus, and then insert the prepared sheet into the sheets which were sent from the client computer and on which the images have been already formed respectively on the basis of the character string indicating the instruction included in the original data from the client computer.

In this case, for example, the print process based on the image data on the page is performed to the page having no insert mark in the original received from the client computer, and the sheet on which such the print process has ended is discharged to a sheet discharge unit of the image formation apparatus. On the other hand, such the print process is not performed on the sheet having the insert mark. Instead, the sheet on which the image has been already formed is fed from the sheet feed cassette, and the fed sheet is discharged to the sheet discharge unit as it is (i.e., since the image has been formed on this sheet, image formation is not performed by the printer unit any more). Thus, on the sheet discharge unit, the sheets on which the pages having no insert mark have been printed respectively and the sheets on which the images have been previously formed respectively are gathered as one output result and stacked.

As described above, in the embodiment, in the case where the original is created on the information processing apparatus such as the client computer or the like, the arbitrary information representing the instruction of the process to be performed on the side of the image formation apparatus has been written in the original, the original including the page having such the instruction is output as the print job to the image formation apparatus, and the operation based on such the instruction is actually performed by the image formation apparatus. Thus, a user's load necessary in case of creating one document by using the plural processes can be reduced, and also operability can be improved.

In the embodiment, the case where the image server 200 and the copying machine 1000 are independent respectively was explained. The present invention is not limited to this.

Namely, the present invention is applicable to a case where the image server 200 is built in the copying machine 1000, when the above control processes are performed.

Hereinafter, the structure of the data processing program readable in the image server system to which the server apparatus and the image formation apparatus according to the present invention are applicable will be explained with reference to a memory map shown in FIG. 18.

FIG. 18 is the diagram for explaining the memory map of a storage medium which stores the various data processing programs readable in the image server system to which the server apparatus and the image formation apparatus according to the present invention are applicable.

It should be noted that, though not shown in the drawings, information such as version information, a creator and the like which manages a program group stored in the storage medium is also stored in the medium. Further, information such as an icon for discriminatively displaying the program and the like which depends on an OS or the like on the program reading side might be stored in the storage medium.

Further, data depending on the various programs are managed as directory information in the storage medium. Further, in a case where programs to be installed and other data have been compressed, a program or the like used to decompress the programs and the data might be stored in the storage medium.

The functions shown in FIGS. 13 to 17 in the embodiment might be executed by a host computer on the basis of a program externally installed. In this case, the present invention is applicable to a case where a group of the information including the programs is supplied to an output apparatus from a storage medium such as a CD-ROM, a flash memory, an FD (floppy disk) or the like, or from an external storage medium through a network.

As described above, it is needless to say that the object of the present invention can be achieved in a case where the storage medium recording the program codes of software to realize the functions of the embodiment is supplied to a system or apparatus, and then a computer (or CPU or MPU) in this system or apparatus reads and executes the stored program codes.

In this case, the program codes themselves read from the storage medium execute new functions of the present invention, whereby the storage medium storing these program codes constitutes the present invention.

As the storage medium from which the program codes are supplied, e.g., a floppy disk, a hard disk, an optical disk, a magnetooptical disk, a CD-ROM, a CD-R, a DVD-ROM, a magnetic tape, a nonvolatile memory card, a ROM, an EEPROM, a silicon disk, or the like can be used.

Further, it is needless to say that the present invention includes not only the case where the functions of the embodiment are executed by the program codes read by the computer, but also a case where an OS (operating system) or the like running on the computer executes a part or all of the actual processes based on instructions of the program codes and thus the functions of the embodiment are executed by such the processes.

Further, it is needless to say that the present invention includes a case where the program codes read from the storage medium are once stored in a memory provided in a function expansion board inserted in the computer or a function expansion unit connected to the computer, and then a CPU or the like provided in the function expansion board or the function expansion unit performs all or a part of the actual processes based on instructions of the program codes, whereby the functions of the embodiment are achieved by such the processes.

Further, the present invention is applicable to a system structured by plural equipments or to an apparatus structured by one equipment. Further, it is needless to say that the present invention is applicable to a case where programs are supplied to the system or the apparatus. In this case, when the storage medium storing the programs represented by the software to achieve the present invention is subjected to reading by the system or apparatus, such the system or the apparatus can enjoy the effects of the present invention.

Further, when the programs represented by the software to achieve the present invention are downloaded from a data base on a network and read according to a communication program, such the system or the apparatus can enjoy the effects of the present invention.

As described above, according to the embodiment, the PDL data of each page included in the print job to be input from the client computer is sequentially developed into the print image data, each of the developed print image data is stored, the insert mark set in the print job through the setting screen of FIG. 10 is compared with the PDL data of each page in the print job, it is judged based on the comparison whether or not each page of the print job is the insert page to which the image data externally input is inserted, the job management information which includes the page management information including the information of linking the each page of the print job with each of the print image data stored in the memory and the information of indicating whether or not the each page of the print job is the insert page and the job ID of specifying the print job is created for each job to be input, the job management table including the job management information for each of the jobs is held, the job selection list is created with reference to the job management table on the basis of the job selection list obtaining request from the image processing apparatus and transferred to the image processing apparatus, the judged result indicating whether or not the designated page of the designated print job is the insert page is transferred to the image processing apparatus with reference to the job management table in accordance with inquires from the image processing apparatus, and the print image data corresponding to the designated page of the job designated in the image data obtaining request is uniquely selected from the memory and transferred to the image processing apparatus with reference to the job management table on the basis of the image data obtaining request from the image processing apparatus. Thus, even for the original not previously digitized on the information processing apparatus, it is possible by using the scanner function on the server apparatus side to add at arbitrary timing the arbitrary scan insert original to the designated page position of the document including the plural pages without making the raster image of the original data on the client side (the information processing apparatus side).

Further, according to the embodiment, the PDL data of each page included in the print job to be input is sequentially developed into the print image data, each of the developed print image data is stored, the insert mark set in the print job is compared with the PDL data of each page in the print job, it is judged based on the comparison whether or not each page of the print job is the insert page to which the image data externally input is inserted, the job management information which includes the page management information including the information of linking the each page of the print job with each of the print image data stored in the memory and the information of indicating whether or not the each page of the print job is the insert page and the job ID of specifying the print job is created for each job to be input, the job management table including the job management information for each of the jobs is held, the job selection list is created with reference to the job management table on the basis of the job selection list obtaining request from the image processing apparatus and transferred to the image processing apparatus, the judged result indicating whether or not the designated page of the designated print job is the insert page is transferred to the image processing apparatus with reference to the job management table in accordance with inquires from the image processing apparatus, the image data transferred from the image processing apparatus is stored, and the page management information of the designated page is updated so as to link the stored image data with the designated page of the designated print job. Thus, even for the original not previously digitized on the information processing apparatus, it is possible by using the scanner function on the server apparatus side to link at arbitrary timing the raster image of the read insert original with the raster image corresponding to the page previously designated with the specific marking of the print image on the server apparatus, without making the raster image of the original data on the client side (the information processing apparatus side). Therefore, it is possible to freely add the insert original later so as to complete the print job.

Further, according to the embodiment, the job selection list obtaining request used in selecting the print jobs being managed for the server apparatus is issued, any of the print jobs is selected by displaying the job selection list transferred from the server apparatus in response to the job selection list obtaining request, and then the print process in which, for each of pages of the selected print job, it is sequentially inquired whether or not the pages are insert pages for the server apparatus and the image data obtaining request is issued for the server apparatus in accordance with the inquired result, then the print image data transferred from the server apparatus is output using the printer and a copying process in which the image input of the insert originals is performed in real time by the scanner apparatus, then the image data is output using the printer are switched and controlled. Thus, even for the original not previously digitized on the information processing apparatus, it is possible by using the scanner function on the server apparatus side to add at arbitrary timing the arbitrary scan insert original to the designated page position of the document including the plural pages each time without making the raster image of the original data on the client side (the information processing apparatus side).

Further, according to the embodiment, the job selection list obtaining request used in selecting the print jobs being managed for the server apparatus is issued, any of the print jobs is selected by displaying the job selection list transferred from the server apparatus in response to the job selection list obtaining request, it is sequentially inquired to the server apparatus whether or not the page is the insert page for each page of the selected print job, and the image input of the insert originals is performed from the scanner apparatus and the input originals are transferred to the server apparatus in accordance with the inquired result. Thus, even for the original not previously digitized on the information processing apparatus, it is possible by using the scanner function on the server apparatus side to link at arbitrary timing the raster image of the read insert original with the raster image corresponding to the page previously designated with the specific marking of the print image on the server apparatus, without making the raster image of the original data on the client side (the information processing apparatus side). Therefore, it is possible to freely add the insert original later so as to complete the print job.

As described above, according to the embodiment, in the case where the original not previously digitized on the computer is intended to be inserted to the arbitrary page of the series of documents previously digitized on the computer, such troublesome working as below is not required to the user. Namely, as such the troublesome working, e.g., there is the working that the original not previously digitized on the computer is digitized one by one by the user with use of the scanner or the like on the client computer, the digitally read original is inserted to another original on the client computer to gather these originals as one page original. Therefore, even if the document contains a great number of pages, it is possible to easily exchange the necessary pages later, whereby the user's load necessary in case of creating one document by using the plural processes can be reduced, and also operability can be improved.

As many apparently and widely different embodiments can be made without departing from the spirit and scope of the present invention, it is to be understood that the present invention is not limited to the above embodiment expect as defined in the appended claims.

What is claimed is:

1. An apparatus comprising:
  a remote information processing apparatus which can selectively send first data of a series of originals including at least both of a specific page including a command for causing a printer apparatus to perform a specific processing and a page where the command is not included and second data of a series of originals where the specific page is not included;
  a controller including an input unit adapted to input the data from said remote information processing apparatus; and
  a printer apparatus to print based on the input data, wherein
  said controller is adapted to cause said printer apparatus to perform a printing process of input originals data from said remote information processing apparatus, and
  wherein said controller causes said printer apparatus to perform the printing process of the data and causes said printer apparatus to perform the specific processing, in case that the data input by said input unit is the first data of the series of originals including at least both of the specific page including the command for causing said printer apparatus to perform the specific processing and the page where the command is not included, and
  wherein said controller causes said printer apparatus to perform printing process of the data, without executing the specific processing, in case that the data input by said input unit is the second data of the series of originals where the specific page is not included.

2. An apparatus according to claim 1, wherein said controller causes said printer apparatus not to print the page to which the information indicating the instruction for said printer apparatus is added.

3. An apparatus according to claim 2, wherein said controller executes processing aimed for generating data, of which state is that an instruction added page in original data input from said remote information processing apparatus is exchanged to a page of the original data from a scanner unit, as one document.

4. An apparatus according to claim 3, wherein said controller prints data obtained by performing an exchange between the instruction added page in the original data input from said remote information processing apparatus and the page of the original data from the scanner unit as one document.

5. An apparatus according to claim 3, wherein said controller stores data obtained by performing an exchange between the instruction added page in the original data input from said remote information processing apparatus and the page of the original data from the scanner unit into storage means as one document.

6. An apparatus according to claim 2, wherein said remote image formation apparatus has storage means for previously storing sheets on which images were formed, and said controller causes the image formation apparatus to print the pages other than the page, to which the information indicating the instruction for the image formation apparatus is added, included in the data of a series of the originals and the sheets on which images were formed are previously fed from said storage means in accordance with a fact that the page judged to exist in the input data of the series of originals is the page to which the information indicating the instruction for said image formation apparatus is added, then processing for inserting the fed sheet among sheets, on which images of the pages other than the page to which the information indicating the instruction is added are formed, is executed on the basis of the instruction.

7. An image processing method adapted to an apparatus having an input unit adapted to input data from a remote information processing apparatus which can selectively send first data of a series of originals including at least both of a specific page including a command for causing a printer apparatus to perform a specific processing and a page where the command is not included and second data of a series of originals where the specific page is not included, said method comprising the steps of:
  causing the remote information processing apparatus to selectively send the first data and the second data;
  causing a controller including an input unit to input data from the remote information processing apparatus;
  causing the printer apparatus to perform a printing process of input originals data from the remote information processing apparatus; and
  causing the printer apparatus to perform the printing process of the data and causing the printer apparatus to perform the specific processing, in case that the data input by the input unit is the first data of the series of originals including at least both of the specific page including the command for causing the printer apparatus to perform the specific processing and the page where the command is not included; and
  causing the printer apparatus to perform the printing process of the data, without executing the specific processing, in case that the data input by the input unit is the second data of the series of originals where the specific page is not included.

8. A method according to claim 7, further comprising causing the image formation apparatus not to print the page to which the information indicating the instruction for the image formation apparatus is added.

9. A method according to claim 7, further comprising executing processing aimed for generating data, of which state is that an instruction added page in original data input from the information processing apparatus is exchanged to a page of the original data from a scanner unit, as one document.

10. A method according to claim 7, further comprising printing data obtained by performing an exchange between the instruction added page in the original data input from the information processing apparatus and the page of the original data from the scanner unit as one document.

11. A method according to claim 7, further comprising storing data obtained by performing an exchange between the instruction added page in the original data input from the information processing apparatus and the page of the original data from the scanner unit into storage means as one document.

12. A method according to claim 7, further comprising providing storage means for previously storing sheets on which images were formed, and causing the image formation apparatus to print the pages other than the page, to which the information indicating the instruction for the image formation apparatus is added, included in the data of a series of the originals and the sheets on which images were formed are previously fed from the storage means in accordance with a fact that the page judged to exist in the input data of the series of originals is the page to which the information indicating the instruction for the image formation apparatus is added, then processing for inserting the fed sheet among sheets, on which images of the pages other than the page to which the information indicating the instruction is added are formed, is executed on the basis of the instruction.

13. A computer-readable medium storing a computer program for an image processing method adapted to an apparatus having an input unit adapted to input data from a remote information processing apparatus which can selectively send first data of a series of originals including at least both of a specific page including a command for causing a printer apparatus to perform a specific processing and a page where the command is not included and second data of a series of originals where the specific page is not included comprising the steps of:
  causing the remote information processing apparatus to selectively send the first data and the second data;
  causing a controller including an input unit to input data from the remote information processing apparatus;
  causing the printer apparatus to perform a printing process of input originals data from the remote information processing apparatus; and
  causing the printer apparatus to perform the printing process of the data and causing the printer apparatus to perform the specific processing, in case that the data input by the input unit is the first data of the series of originals including at least both of the specific page including the command for causing the printer apparatus to perform the specific processing and the page where the command is not included; and
  causing the printer apparatus to perform the printing process of the data, without executing the specific processing, in case that the data input by the input unit is the second data of the series of originals where the specific page is not included.

* * * * *

UNITED STATES PATENT AND TRADEMARK OFFICE
CERTIFICATE OF CORRECTION

| | |
|---|---|
| PATENT NO. | : 7,295,335 B2 |
| APPLICATION NO. | : 09/892450 |
| DATED | : November 13, 2007 |
| INVENTOR(S) | : Naoto Arakawa |

Page 1 of 1

It is certified that error appears in the above-identified patent and that said Letters Patent is hereby corrected as shown below:

<u>COLUMN 10</u>:

Line 57, "jog" should read --job--.

<u>COLUMN 22</u>:

Line 35, "inquires" should read --enquiries--.

Signed and Sealed this

Third Day of February, 2009

JOHN DOLL
*Acting Director of the United States Patent and Trademark Office*